(12) United States Patent  
Ohtake

(10) Patent No.: US 8,254,037 B2  
(45) Date of Patent: Aug. 28, 2012

(54) LENS BARREL AND IMAGING APPARATUS

(75) Inventor: Motoyuki Ohtake, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/972,770

(22) Filed: Dec. 20, 2010

(65) Prior Publication Data

US 2011/0157721 A1 Jun. 30, 2011

(30) Foreign Application Priority Data

Dec. 25, 2009 (JP) ................................. 2009-295379

(51) Int. Cl.
*G02B 15/14* (2006.01)
(52) U.S. Cl. ........................................ 359/694; 359/695
(58) Field of Classification Search .................. 359/694, 359/695
See application file for complete search history.

(56) References Cited

U.S. PATENT DOCUMENTS

| 6,195,212 B1* | 2/2001 | Miyamoto ..................... 359/699 |
| 2007/0171554 A1* | 7/2007 | Yoshii et al. .................. 359/819 |

FOREIGN PATENT DOCUMENTS

| JP | 2008-046500 A | 2/2008 |
| JP | 2008-146016 A | 6/2008 |

* cited by examiner

*Primary Examiner* — James Jones
(74) *Attorney, Agent, or Firm* — Wolf, Greenfield & Sacks, P.C.

(57) ABSTRACT

A lens barrel includes: a variable focal length lens system including at least three movable lens groups; and guiding means for moving the variable focal length lens system forward and backward in an optical axis direction. The variable focal length lens system includes at least first, second and third lens groups having positive, negative and positive refracting power, respectively, arranged in this order from an object side. When a lens position setting is changed from a wide angle end state to a telescopic end state, at least the first and third lens groups are moved toward the object side such that air separation between the first and second lens groups monotonically increases and air separation between the second and third lens groups monotonically decreases. The guiding means includes a fixed frame, a rotating frame, a rectilinear guiding frame, a first guide frame, and a second guide frame.

9 Claims, 13 Drawing Sheets

OVERALL CONFIGURATION OF LENS BARREL (COLLAPSED)

OVERALL CONFIGURATION OF LENS BARREL (IN WIDE ANGLE END STATE)

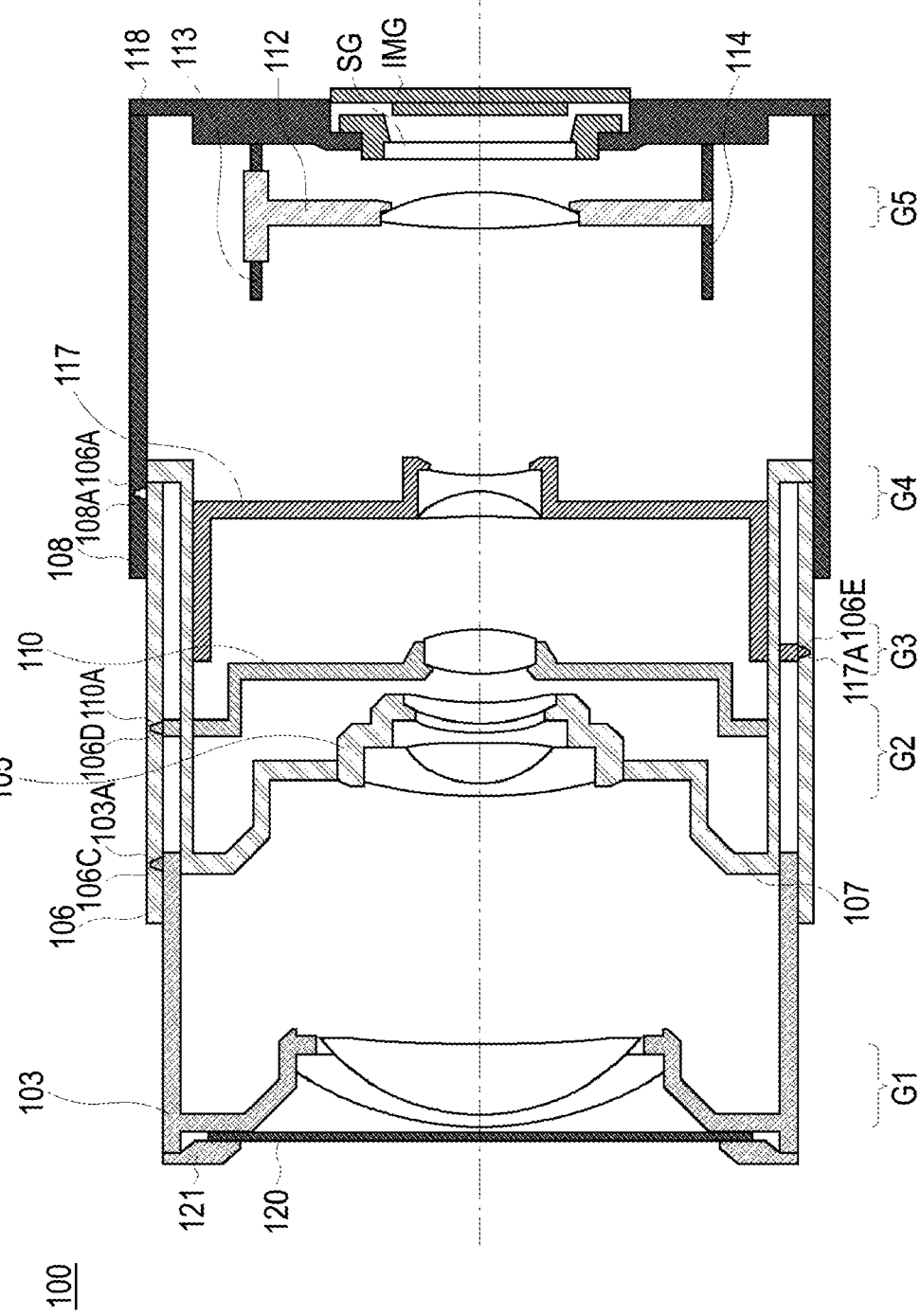

STATE TRANSITION IN LENS BARREL
FIG.4A COLLAPSED STATE
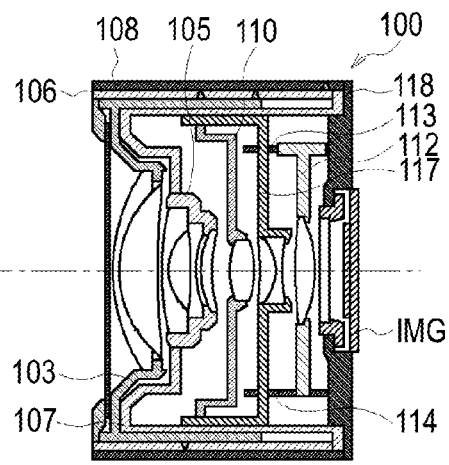
FIG.4B WIDE ANGLE END STATE
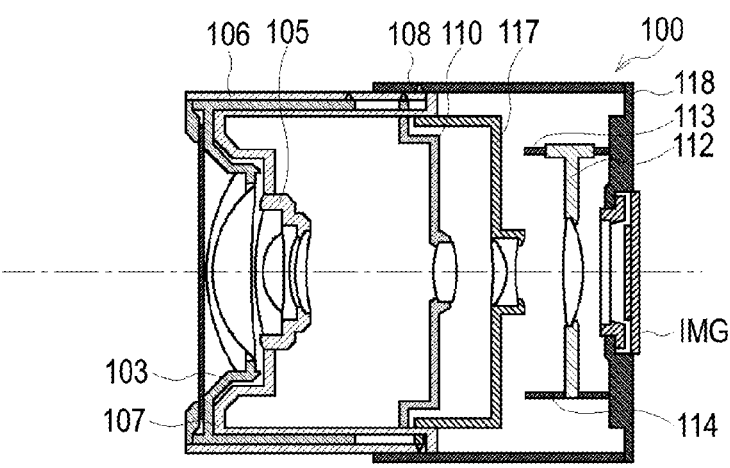
FIG.4C TELESCOPIC END STATE
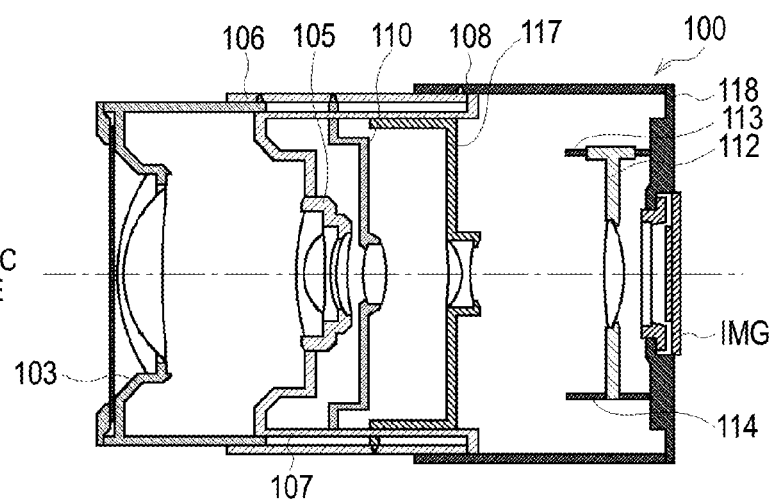

ARRANGEMENT OF REFRACTING POWER IN VARIABLE FOCAL LENGTH LENS SYSTEM CORRESPONDING TO FIRST AND SECOND NUMERICAL EXAMPLES

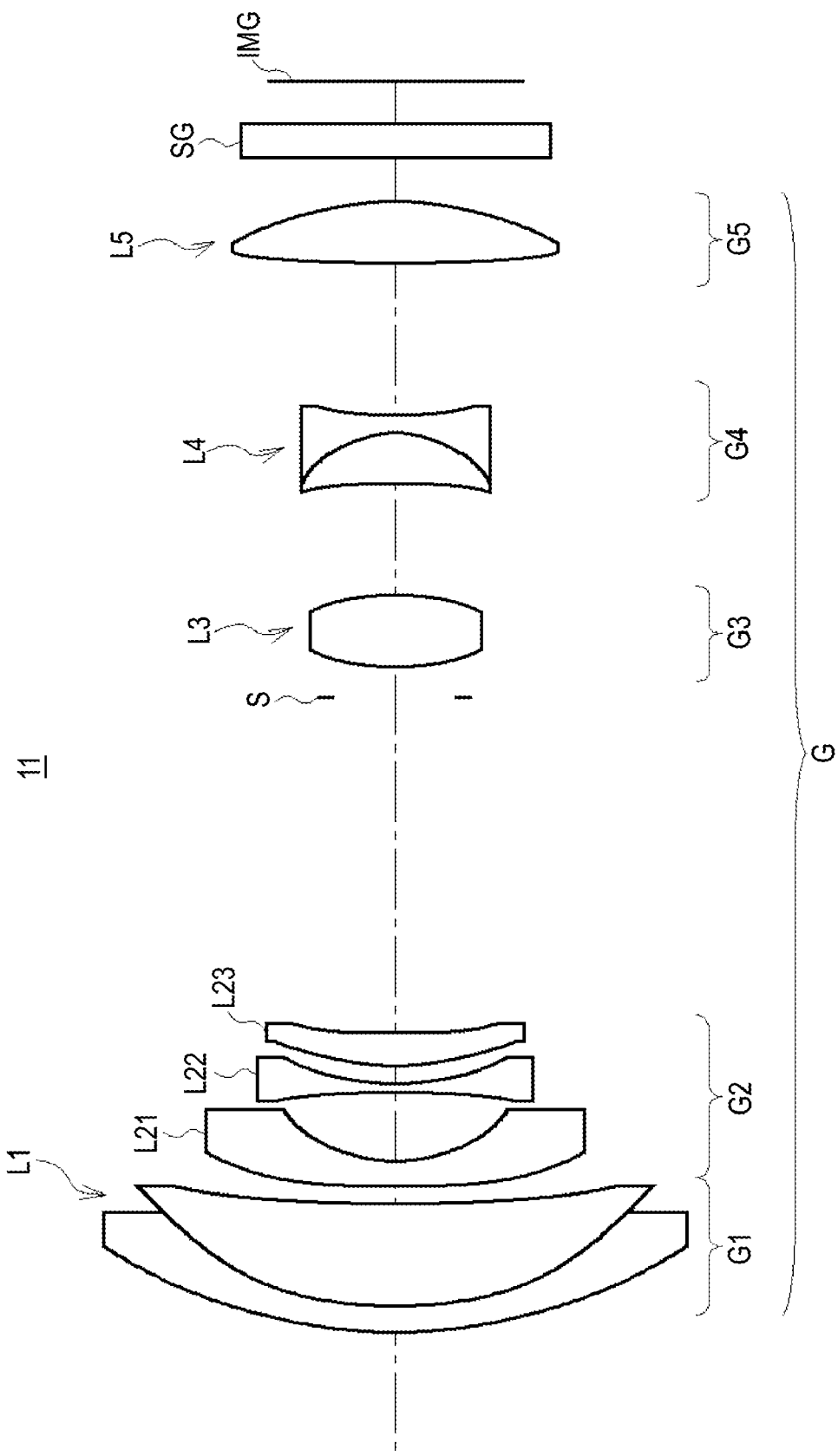

ABERRATIONS IN FIRST NUMERICAL EXAMPLE

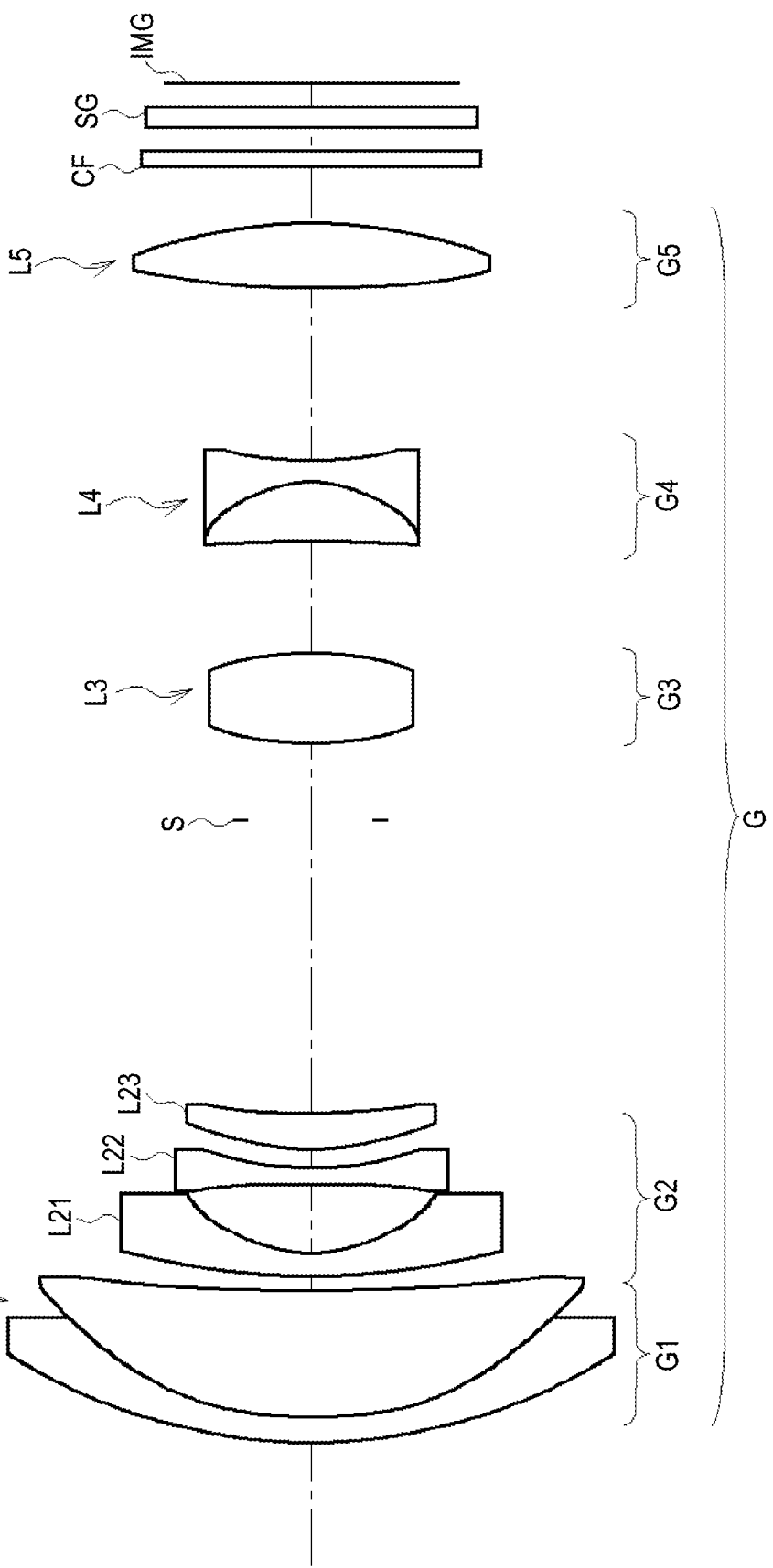

ABERRATIONS IN SECOND NUMERICAL EXAMPLE

ARRANGEMENT OF REFRACTING POWER IN VARIABLE FOCAL LENGTH LENS SYSTEM CORRESPONDING TO THIRD NUMERICAL EXAMPLE

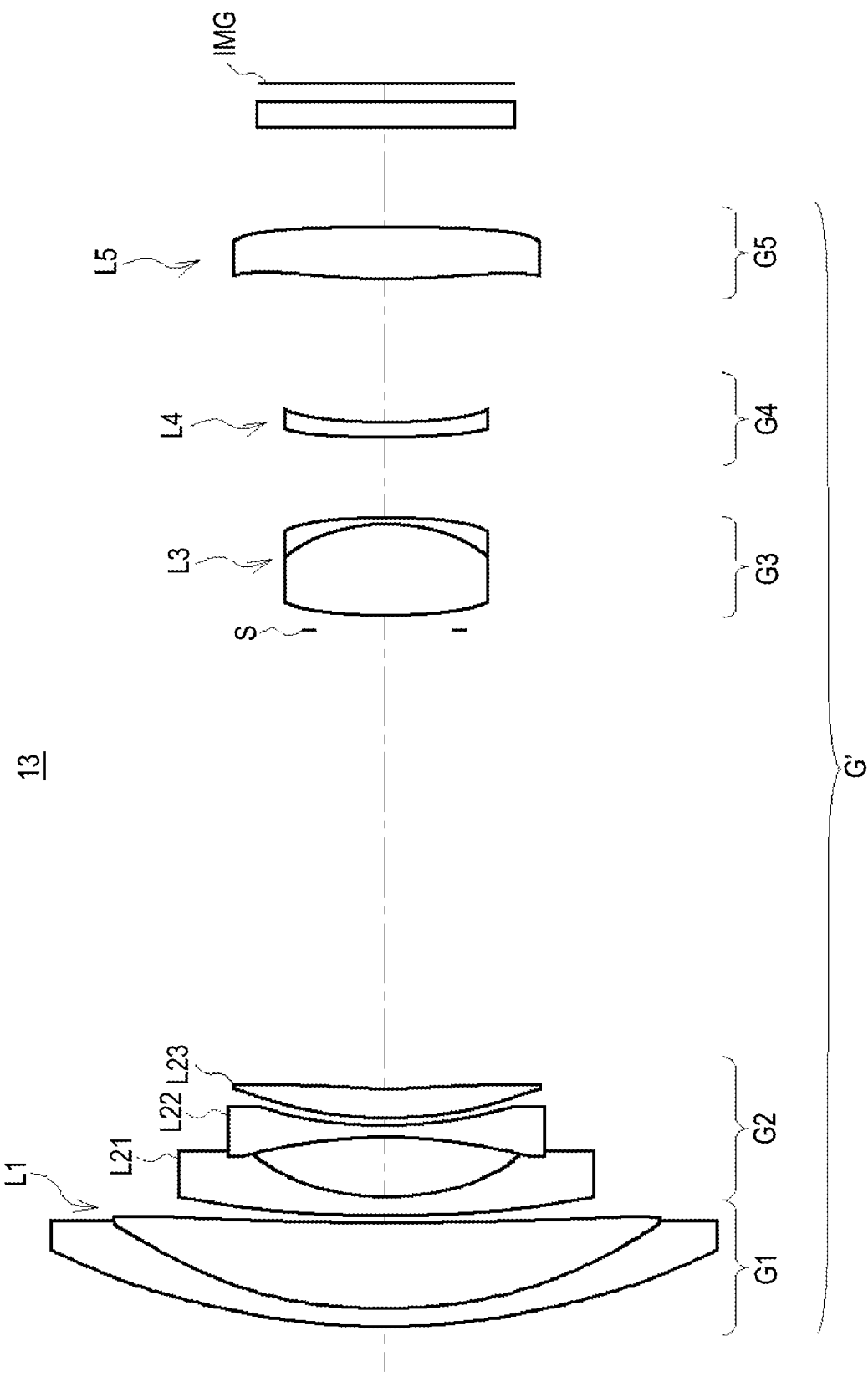
FIG.11 CONFIGURATION OF VARIABLE FOCAL LENGTH LENS SYSTEM IN THIRD NUMERICAL EXAMPLE

ABERRATIONS IN THIRD NUMERICAL EXAMPLE

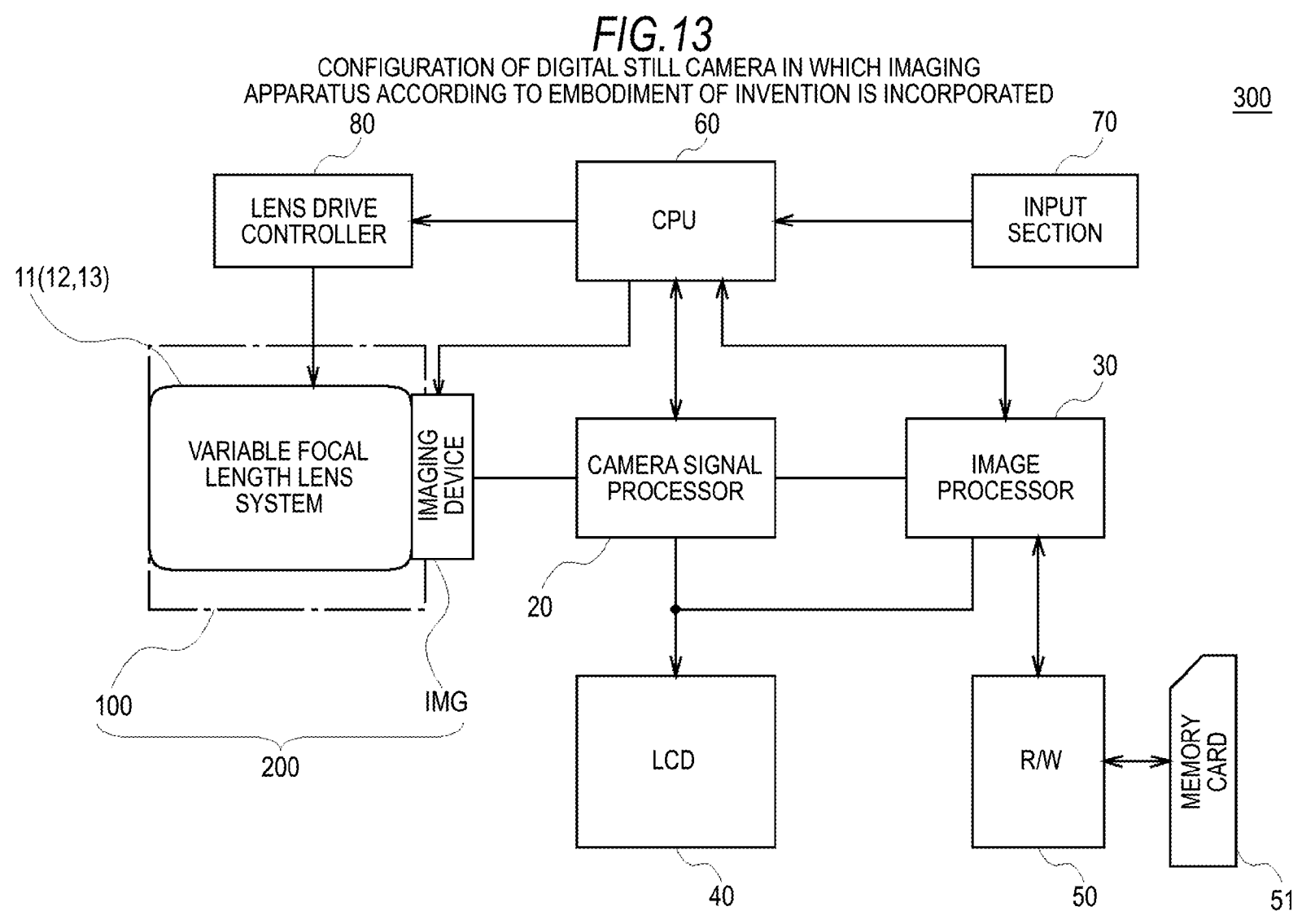

FIG.13
CONFIGURATION OF DIGITAL STILL CAMERA IN WHICH IMAGING APPARATUS ACCORDING TO EMBODIMENT OF INVENTION IS INCORPORATED

LENS BARREL AND IMAGING APPARATUS

BACKGROUND OF THE INVENTION

1. Field of the Invention

The present invention relates to a lens barrel and an imaging apparatus, and particularly to a lens barrel employing what is called a collapsible structure.

2. Description of the Related Art

As recording means in a digital still camera, there has been a known method in which an imaging device formed of photoelectric conversion elements, such as a CCD (Charge Coupled Device) sensor and a CMOS (Complementary Metal Oxide Semiconductor) sensor, converts the amount of light of a subject image formed on a surface of the imaging device into an electric output, which is then recorded.

As micro-processing technologies have been progressing in recent years, CPUs (Central Processing Units) have run faster and storage media have increased their packing densities, whereby a large amount of image data that has not been handled before can now be processed at high speed.

Light receiving devices have also increased their packing densities and shrunk in size. The higher packing densities allow higher spatial frequency recording, and the size reduction of the light receiving devices allows cameras to be smaller as a whole.

The higher packing densities and size reduction described above, however, disadvantageously reduce the light receiving area of each photoelectric conversion element but increase its susceptibility to noise as its electric output decreases. To address the problems, the amount of light that reaches each of the photoelectric conversion elements is increased by increasing the aperture diameter of an optical system, and tiny lens elements (what is called a microlens array) are disposed in front of the respective photoelectric conversion elements.

A light flux directed to the portion between adjacent photoelectric conversion elements when there is no microlens array is guided by a microlens array to these photoelectric conversion elements, but the micro lens array constrains the exit pupil position of a lens system (distance from the image plane to the exit pupil).

The reason for this is that when the exit pupil position of the lens system approaches the photoelectric conversion elements, that is, when the principal ray that reaches each of the photoelectric conversion elements forms a large angle with the optical axis of the lens system, off-axis light fluxes directed toward the periphery of the screen are inclined to the optical axis by large angles and hence do not reach peripheral photoelectric conversion elements, resulting in an insufficient amount of light.

In recent years, as digital still cameras have been widely used, customer needs have become diverse. In particular, small digital still cameras equipped with zoom lenses having high variable power ratios have become popular, and so have zoom lenses having a variable power ratio as high as 5 or greater.

A zoom lens type is often categorized by a zoom lens type representing the configuration of the zoom lens, and a zoom lens having a high variable power ratio has typically employed a zoom lens type formed of four lens groups, positive, negative, positive, and positive lens groups. The zoom lens type formed of four lens groups, positive, negative, positive, and positive lens groups, includes a first lens group having positive refracting power, a second lens group having negative refracting power, a third lens group having positive refracting power, and a fourth lens group having positive refracting power arranged in this order from the object side.

In a zoom lens employing the zoom lens type formed of four lens groups, positive, negative, positive, and positive lens groups, when the lens position setting representing the positions of the lenses that form the zoom lens is changed from a wide angle end state in which the focal length of the zoom lens has the smallest value to a telescopic end state in which the focal length has the greatest value, the first to third lens groups are moved in such a way that the distance between the first and second lens groups increases and the distance between the second and third lens groups decreases, and the fourth lens group is separately driven and moved in such a way that change in image plane position (focus position), which should be on the imaging device, is compensated (see JP-A-2008-146016, for example).

As a collapsible lens barrel in which at least four lens groups are driven in the optical axis direction, there has been a known lens barrel structure in which four movable lens groups can be driven, specifically, three lens groups are driven by using cams and the remaining lens group disposed in a position closest to the image plane is separately driven (see JP-A-2008-46500, for example).

A collapsible lens barrel of this type is often used in what is called a collapsible digital still camera, in which the entire lens portion can retract into the body of the camera when the camera is not in operation.

On the other hand, since it has been known that when the number of movable lens groups increases, in general, the degree of freedom in selecting how the lenses are moved in a zooming operation increases, whereby the variable power ratio can be increased or the performance of the zoom lens can be enhanced.

SUMMARY OF THE INVENTION

When the number of movable lens groups increases in a barrel structure in related art, however, the entire thickness of the lens barrel in which a mechanism for moving the movable lens groups forward and backward in the optical axis direction incorporated increases when the lens barrel retracts (is collapsed), resulting in difficulty achieving both improvement in lens performance and reduction in size.

It is desirable to propose a lens barrel suitable for achieving both improvement in lens performance and reduction in size. It is also desirable to propose an imaging apparatus equipped with the lens barrel.

According to an embodiment of the invention, there is provided a lens barrel including a variable focal length lens system including at least three movable lens groups and guiding means for moving the variable focal length lens system forward and backward in an optical axis direction. The variable focal length lens system includes at least a first lens group having positive refracting power, a second lens group having negative refracting power, and a third lens group having positive refracting power arranged in this order from an object side. When a lens position setting is changed from a wide angle end state to a telescopic end state, at least the first and third lens groups are moved toward the object side in such a way that air separation between the first lens group and the second lens group monotonically increases and air separation between the second lens group and the third lens group monotonically decreases. The guiding means includes a fixed frame, a rotating frame that moves forward and backward in the optical axis direction relative to the fixed frame while rotating around an optical axis relative to the fixed frame, a rectilinear guiding frame that is disposed in the rotating frame and does not rotate when the rotating frame rotates but moves integrally therewith in the optical axis direction, a first guide frame that moves the first lens group forward and backward in the optical axis direction relative to the rectilinear guiding frame, and a second guide frame that moves the third lens group forward and backward in the optical axis direction relative to the rectilinear guiding frame. The second lens group is integrated with the rectilinear guiding frame, and the rectilinear guiding frame is fixed in the optical axis direction when the lens position setting is changed from the wide angle end state to the telescopic end state.

In the thus configured lens barrel, since the second lens group is integrated with the rectilinear guiding frame and the rectilinear guiding frame, which holds the second lens group, is fixed in the optical axis direction when the lens position setting is changed from the wide angle end state to the telescopic end state, the configuration can be simplified as compared with a case where a second lens group holding member for holding the second lens group is provided separately from the rectilinear guiding frame. Further, since the second lens group is fixed in the optical axis direction by using the rectilinear guiding frame, size reduction and a high variable power ratio can be achieved.

In the lens barrel, the variable focal length lens system is desirably configured to satisfy the following conditional equation (1):

$$0.7 < TLw/TLt < 0.85 \quad (1)$$

where TLw represents the overall length of the lens system in the wide angle end state, and TLt represents the overall length of the lens system in the telescopic end state.

The conditional equation (1) defines the change in the overall length of the lens system that occurs when the lens position setting is changed, that is, the conditional equation (1) determines how much a first lens group holding member can be extended.

When TLw/TLt is greater than the upper limit of the conditional equation (1), the first lens group holding member becomes thicker in the optical axis direction, resulting in an increased barrel thickness at the time when the lens system retracts.

As a result, in the lens barrel, the barrel thickness at the time when the lens system retracts is not thin enough, and sufficient size reduction will not be achieved.

When TLw/TLt is smaller than the lower limit of the conditional equation (1), the rotating frame and the fixed frame become thicker in the optical axis direction by the amount corresponding to the decrease in thickness of the first lens group holding member in the optical axis direction.

As a result, in the lens barrel, when TLw/TLt is smaller than the lower limit of the conditional equation (1), the barrel thickness at the time when the lens system retracts is not thin enough, and sufficient size reduction will not be achieved.

In the lens barrel, the variable focal length lens system is desirably configured to satisfy the following conditional equations (2) and (3):

$$0.2 < \Delta 3/TLt < 0.4 \quad (2)$$

$$0.05 < \Delta 4/TLt < 0.2 \quad (3)$$

where $\Delta 3$ represents how much the third lens group travels when the lens position setting is changed from the wide angle end state to the telescopic end state, and $\Delta 4$ represents how much the fourth lens group travels when the lens position setting is changed from the wide angle end state to the telescopic end state.

The conditional equations (2) and (3) respectively define how much the third and fourth lens groups travel when the lens position setting is changed. When $\Delta 3/TLt$ is smaller than the lower limit of the conditional equation (2), the effect of the third lens group on changing the magnification of the lens system is insufficient.

As a result, in the lens barrel, the effect of the second lens group in the variable focal length lens system on changing the magnification of the lens system is instead increased to provide a predetermined variable power ratio. In this case, it is difficult to correct change in axial aberrations in a satisfactory manner induced in the second lens group when the lens position setting is changed.

Conversely, when $\Delta 3/TLt$ is greater than the upper limit of the conditional equation (2), the travel of a third lens holding member increases. As a result, in the lens barrel, a cam in the rotating frame needs to extend in the optical axis direction, which causes the cam to mechanically interfere with other cams. To prevent the interference, the rotating frame inevitably needs to be thicker in the optical axis direction, resulting in an increased thickness of the lens barrel in a collapsed state in which the lens system retracts.

When $\Delta 4/TLt$ is smaller than the lower limit of the conditional equation (3), off-axis light fluxes having passed through the fourth lens group greatly shift away from the optical axis in the telescopic end state. As a result, in the lens barrel, change in off-axis aberrations induced in the fourth lens group due to the change in angular field of view may not be corrected in a satisfactory manner, resulting in no further improvement in the optical performance.

Conversely, when $\Delta 4/TLt$ is greater than the upper limit of the conditional equation (3), the lateral magnification of the fourth lens group in the telescopic end state increases in the positive direction. As a result, an image formed by the first to third lens groups is greatly magnified. In this case, the optical performance may significantly decrease even when any of the first to third lens groups is slightly decentered in a manufacturing process.

In the lens barrel, it is more preferable that the following conditional equation (4) as well as the conditional equations (2) and (3) are satisfied.

$$\Delta 4/\Delta 3 < 0.9 \quad (4)$$

When $\Delta 4/\Delta 3$ is greater than the upper limit of the conditional equation (4), a cam follower on the third lens holding member and a cam follower on a fourth lens holding member interfere with each other in the telescopic end state. As a result, the rotating frame inevitably needs to be thicker in the optical axis direction, resulting in an increased barrel thickness.

Further, in the variable focal length lens system in the lens barrel, an aperture diaphragm is desirably disposed in the vicinity of the third lens group in order to reduce the effective lens diameter in each of the lens groups so that change in off-axis aberrations that occurs when the lens position setting is changed is corrected in a satisfactory manner.

In general, when the lens position setting is changed, the height of off-axis light fluxes passing through each of the lens groups tends to change as the number of lens groups the distance from which to the aperture diaphragm changes increases. The change in the height is used to correct the change in off-axis aberrations that occurs when the lens position setting is changed, and the correction can be made in a more satisfactory manner by intentionally changing the height of off-axis light fluxes.

In particular, in the variable focal length lens system in the lens barrel, when an aperture diaphragm is disposed in the vicinity of the third lens group, a plurality of movable lens groups can be disposed upstream and downstream of the aperture diaphragm in a well balanced manner, whereby comma aberration can be corrected in a more satisfactory manner and the performance of the lens system is enhanced accordingly.

Further, in the variable focal length lens system in the lens barrel, since the third lens group is positioned in the vicinity of the center of the overall lens system, the aperture diaphragm is also positioned in the vicinity of the center of the overall lens system, whereby the off-axis light fluxes passing through each of the lens groups will not greatly shift away from the optical axis. As a result, the lens diameter can be reduced.

In the variable focal length lens system in the lens barrel, the lens diameter can be further reduced and the barrel structure can be simplified by disposing the aperture diaphragm on the object side of the third lens group and integrally moving the aperture diaphragm and the third lens group when the lens position setting is changed.

In the variable focal length lens system in the lens barrel, disposing the aperture diaphragm on the object side of the third lens group allows the height of the off-axis light fluxes having passed through the first lens group from the optical axis to be reduced particularly in the wide angle end state, whereby the size of the lens system can be reduced.

At the same time, in the variable focal length lens system in the lens barrel, since the off-axis light fluxes having passed through the first lens group shift toward the optical axis in the wide angle end state, comma aberration that appears in the periphery of the screen can be suppressed and the performance of the lens system can be enhanced accordingly.

Further, in the variable focal length lens system in the lens barrel, the following conditional equation (5) is desirably satisfied to reduce the lens diameter and shorten the overall length of the lens system in a well balanced manner:

$$1.8 < fl/(fw \times ft)^{1/2} < 2.7 \qquad (5)$$

where fl represents the focal length of the first lens group, fw represents the focal length of the overall lens system in the wide angle end state, and ft represents the focal length of the overall lens system in the telescopic end state.

The conditional equation (5) defines the focal length fl of the first lens group. When $fl/(fw \times ft)^{1/2}$ is greater than the upper limit of the conditional equation (5), light fluxes passing through the first lens group less converges in the variable focal length lens system in the lens barrel, resulting in an increased overall length of the lens system in the telescopic end state.

Conversely, when $fl/(fw \times ft)^{1/2}$ is smaller than the lower limit of the conditional equation (5), light fluxes passing through the first lens group more converges in the variable focal length lens system in the lens barrel, resulting in an increased lens diameter because off-axis light fluxes in the wide angle end state shift away from the optical axis.

On the other hand, when the refracting power of the first lens group increases, higher-order spherical aberrations induced in the first lens group alone in the telescopic end state may not be corrected in a satisfactory manner. In this case, it is conceivable that a variable aperture diaphragm is used and the size of the full aperture is changed when the lens position setting is changed, which however, for example, increases noise when a low-illuminance subject is imaged.

In consideration of this fact, it is desirable in the variable focal length lens system in the lens barrel that the lower limit of the conditional equation (5) is set to "2.0" to correct the higher-order spherical aberrations induced in the first lens group alone in a more satisfactory manner so that the full-aperture f-number decreases in the telescopic end state.

According to another embodiment of the invention, there is provided an imaging apparatus including a lens barrel including a variable focal length lens system including at least three movable lens groups and guiding means for moving the variable focal length lens system forward and backward in an optical axis direction and an imaging device that converts an optical image formed by the variable focal length lens system into an electric signal. The variable focal length lens system includes at least a first lens group having positive refracting power, a second lens group having negative refracting power, and a third lens group having positive refracting power arranged in this order from an object side. When a lens position setting is changed from a wide angle end state to a telescopic end state, at least the first and third lens groups are moved toward the object side in such a way that air separation between the first lens group and the second lens group monotonically increases and air separation between the second lens group and the third lens group monotonically decreases. The guiding means includes a fixed frame, a rotating frame that moves forward and backward in the optical axis direction relative to the fixed frame while rotating around an optical axis relative to the fixed frame, a rectilinear guiding frame that is disposed in the rotating frame and does not rotate when the rotating frame rotates but moves integrally therewith in the optical axis direction, a first guide frame that moves the first lens group forward and backward in the optical axis direction relative to the rectilinear guiding frame, and a second guide frame that moves the third lens group forward and backward in the optical axis direction relative to the rectilinear guiding frame. The second lens group is integrated with the rectilinear guiding frame, and the rectilinear guiding frame is fixed in the optical axis direction when the lens position setting is changed from the wide angle end state to the telescopic end state.

In the thus configured imaging apparatus, in the lens barrel, since the second lens group is integrated with the rectilinear guiding frame and the rectilinear guiding frame, which holds the second lens group, is fixed in the optical axis direction when the lens position setting is changed from the wide angle end state to the telescopic end state, the configuration can be simplified as compared with a case where a second lens group holding member for holding the second lens group is provided separately from the rectilinear guiding frame. Further, since the second lens group is fixed in the optical axis direction by using the rectilinear guiding frame, size reduction and a high variable power ratio can be achieved.

In the lens barrel according to the embodiment of the invention, since the second lens group is integrated with the rectilinear guiding frame and the rectilinear guiding frame, which holds the second lens group, is fixed in the optical axis direction when the lens position setting is changed from the wide angle end state to the telescopic end state, the configuration can be simplified as compared with a case where a second lens group holding member for holding the second lens group is provided separately from the rectilinear guiding frame. Further, since the second lens group is fixed in the optical axis direction by using the rectilinear guiding frame, size reduction and a high variable power ratio can be achieved. Therefore, the lens barrel is suitable for achieving both improvement in lens performance and reduction in size.

In the imaging apparatus according to the embodiment of the invention, in the lens barrel, since the second lens group is integrated with the rectilinear guiding frame and the rectilinear guiding frame, which holds the second lens group, is fixed in the optical axis direction when the lens position setting is changed from the wide angle end state to the telescopic end state, the configuration can be simplified as compared with a case where a second lens group holding member for holding the second lens group is provided separately from the rectilinear guiding frame. Further, since the second lens group is fixed in the optical axis direction by using the rectilinear guiding frame, size reduction and a high variable power ratio can be achieved. Therefore, the imaging apparatus includes a lens barrel suitable for achieving both improvement in lens performance and reduction in size.

BRIEF DESCRIPTION OF THE DRAWINGS

FIG. 3 is a diagrammatic cross-sectional view showing the overall configuration of the lens barrel (in a telescopic end state);

FIGS. 4A to 4C are diagrammatic cross-sectional views for describing state transition in the lens barrel;

FIG. 6 is a diagrammatic cross-sectional view showing the configuration of a variable focal length lens system in a first numerical example;

FIG. 8 is a diagrammatic cross-sectional view showing the configuration of a variable focal length lens system in a second numerical example;

FIG. 11 is a diagrammatic cross-sectional view showing the configuration of a variable focal length lens system in a third numerical example;

FIG. 13 is a block diagram showing the configuration of a digital still camera in which the imaging apparatus according to an embodiment of the invention is incorporated.

DESCRIPTION OF THE PREFERRED EMBODIMENTS

Figure 1:
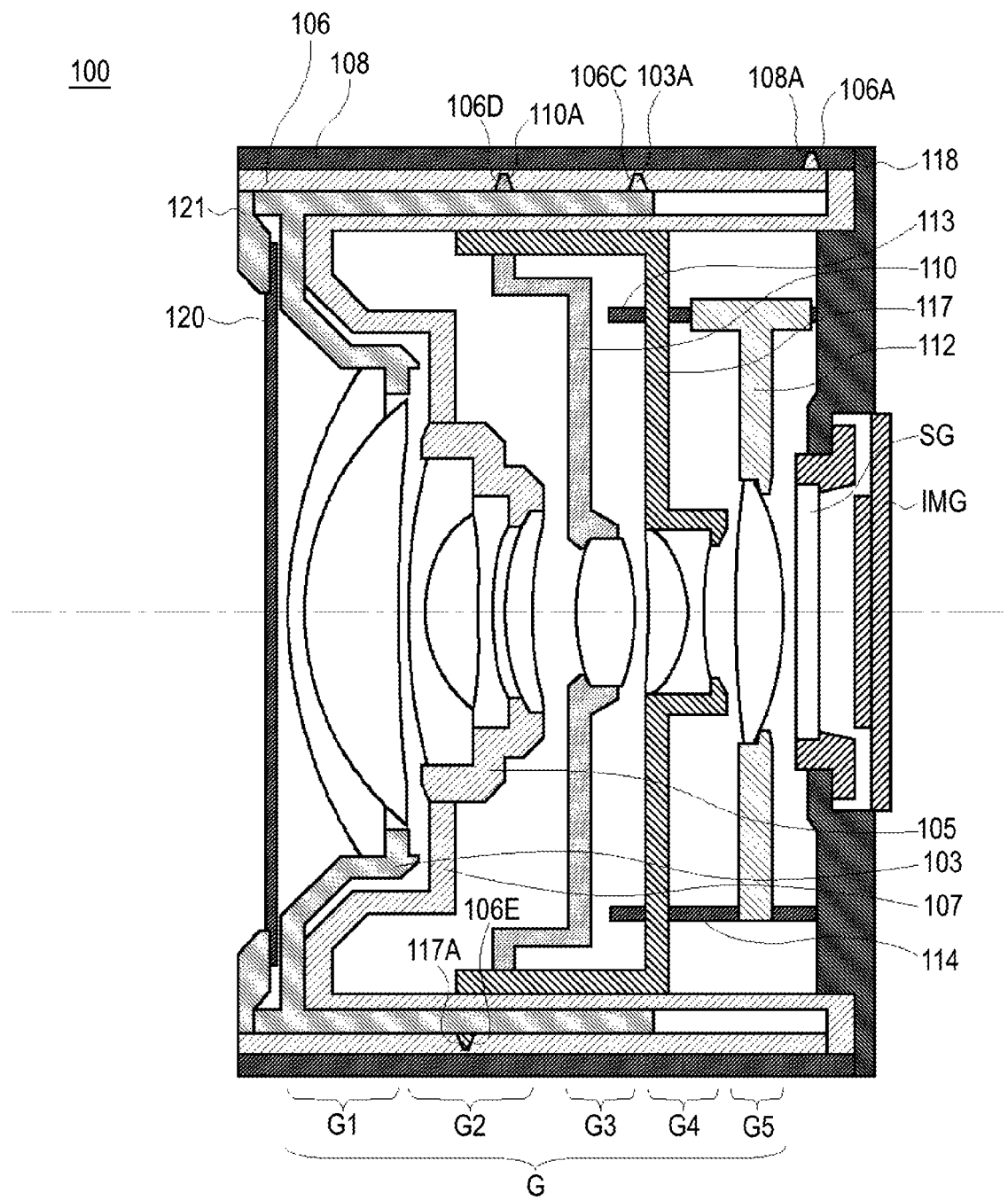
FIG. 1 is a diagrammatic cross-sectional view showing the overall configuration of a lens barrel (in a collapsed state)

Modes for carrying out the invention (hereinafter referred to as an embodiment) will be described below. The description will be made in the following order:
1. First embodiment
2. Numerical examples corresponding to first embodiment (first and second numerical examples)
3. Second embodiment
4. Numerical example corresponding to second embodiment (third numerical example)
5. Configurations of imaging apparatus and digital still camera
6. Other embodiments
<1. First Embodiment>
[1-1. Configuration of Lens Barrel]
A lens barrel in a first embodiment includes a variable focal length lens system having at least three movable lens groups and a drive mechanism as guiding means for moving each of the movable lens groups that form the variable focal length lens system forward and backward in the optical axis direction.

In the following description, a lens system whose focus point where an image is brought into focus changes with the focal length is called a variable focal length lens system. On the other hand, being a lens system whose focus point does not change with the focal length, a zoom lens is considered as one type of variable focal length lens system.

A description will first be made of the configuration of the variable focal length lens system in the first embodiment. The variable focal length lens system in the first embodiment is formed of five lens groups, a first lens group having positive refracting power, a second lens group having negative refracting power, a third lens group having positive refracting power, a fourth lens group having negative refracting power, and a fifth lens group having positive refracting power arranged in this order from the object side.

Specifically, in the variable focal length lens system in the first embodiment, when the lens position setting is changed from a wide angle end state in which the focal length of the lens system has the smallest value to a telescopic end state in which the focal length has the greatest value, air separation between the first and second lens groups increases, air separation between the second and third lens groups decreases, air separation between the third and fourth lens groups increases, and air separation between the fourth and fifth lens groups decreases.

At the same time, in the variable focal length lens system in the first embodiment, the first lens group monotonically moves toward the object side, the second lens group is fixed in the optical axis direction, and the third and fourth lens groups move toward the object side.

Further, in the variable focal length lens system in the first embodiment, the fifth lens group is separately driven and moved in such a way that change in image plane position that occurs when the first, third, and fourth lens groups move in the optical axis direction is compensated.

The function of each of the lens groups that form the variable focal length lens system in the first embodiment will next be described. In the variable focal length lens system in the first embodiment, the first and second lens groups are disposed close to each other in the wide angle end state.

As a result, in the variable focal length lens system in the first embodiment, off-axis light fluxes incident on the first lens group shift toward the optical axis, whereby the lens diameter of the first lens group can be reduced.

In practice, in the variable focal length lens system in the first embodiment, the air separation between the first and second lens groups increases when the lens position setting is changed from the wide angle end state to the telescopic end state, and off-axis light fluxes having passed through the first lens group shift away from the optical axis.

In the variable focal length lens system in the first embodiment, however, the change in height of off-axis light fluxes with respect to the optical axis can be used to correct change in off-axis aberrations in a satisfactory manner that occurs when the lens position setting is changed. In particular, in the variable focal length lens system, the aberration correction effect is enhanced by increasing the change in overall length of the lens system to further increase the change in height of off-axis light fluxes with respect to the optical axis.

Further, in the variable focal length lens system in the first embodiment, the air separation between the second and third lens groups is increased in the wide angle end state so that off-axis light fluxes having passed through the second lens group shift away from the optical axis. As a result, axial aberrations and off-axis aberrations can be corrected independently.

Further, in the variable focal length lens system in the first embodiment, the air separation between the second and third lens groups is reduced when the lens position setting is changed from the wide angle end state to the telescopic end state, whereby off-axis light fluxes having passed through the second lens group shift toward the optical axis.

Therefore, in the variable focal length lens system in the first embodiment, the change in height of off-axis light fluxes can be used to correct change in off-axis aberrations in a satisfactory manner that occurs when the lens position setting is changed, whereby the performance of the lens system can be improved.

Further, in the variable focal length lens system in the first embodiment, the third and fourth lens groups are disposed close to each other in the wide angle end state so that off-axis light fluxes having passed through the fourth lens group shift away from the optical axis, whereby change in off-axis aberrations due to the change in angular field of view is corrected in a satisfactory manner.

At the same time, in the variable focal length lens system in the first embodiment, the air separation between the third and fourth lens groups is increased when the lens position setting is changed from the wide angle end state to the telescopic end state, whereby off-axis so that light fluxes having passed through the fourth lens group shift toward the optical axis. As a result, in the variable focal length lens system in the first embodiment, change in off-axis aberrations due to the change in the lens position setting can be corrected in a satisfactory manner.

In the variable focal length lens system in the first embodiment, in which the fourth lens group having negative refracting power and the fifth lens group having positive refracting power are disposed on the image plane side of the third lens group, the second and fourth lens groups, each of which is a negative lens group, are disposed upstream and downstream of an aperture diaphragm, respectively.

In the variable focal length lens system in the first embodiment, the arrangement of refracting power across the lens system is therefore nearly symmetric with respect the aperture diaphragm, and negative distortion that tends to occur particularly in the wide angle end state is thus corrected in a satisfactory manner.

The fifth lens group is moved primarily in such a way that change in image plane position that occurs when the lens groups move is compensated. In the variable focal length lens system in the first embodiment, the air separation between the fourth and fifth lens groups is increased by moving the fourth lens group toward the object side when the lens position setting is changed from the wide angle end state to the telescopic end state.

As a result, in the variable focal length lens system in the first embodiment, off-axis light fluxes having passed through the fifth lens group shift away from the optical axis. The change in height of the off-axis light fluxes can be used to correct change in off-axis aberrations due to the change in angular field of view in a more satisfactory manner.

In general, both high zoom magnification and high performance are achieved by increasing the number of lens groups disposed upstream and downstream of the aperture diaphragm and moving in such a way that the distance to the aperture diaphragm changes. In the variable focal length lens system in the first embodiment, both a high zooming ratio and high performance are achieved by employing the configuration described above and increasing the number of lens groups that move in such a way that the distance from each of the lens groups to the aperture diaphragm changes.

In the collapsible lens barrel in the first embodiment, which employs the lens configuration described above having a structure in which each of the lens groups moves relative to a base member, the second lens group is fixed as the base member in the optical axis direction.

In general, since increasing the number of lenses that form a zoom lens increases the degree of freedom in correcting aberrations, sufficiently high optical performance can be achieved even when the variable power ratio is high. Simply increasing the number of lenses, however, disadvantageously complicates a lens drive mechanism. To solve the problem, there has been a known method for adding a lens group fixed in the optical axis direction.

For example, there has been an interchangeable lens of a known zoom lens type formed of five lens groups having positive, negative, positive, negative, and positive refracting power with the fourth lens group fixed in the optical axis direction, specifically, described in JP-A-2003-241093. In an interchangeable lens of this type, the fourth lens group is fixed in the optical axis direction in order to reduce the travel of the first lens group.

In contrast, in the variable focal length lens system in the first embodiment, the number of movable lens groups is reduced so that the configuration of the lens system is simplified by fixing the second lens group in the optical axis direction across the range from the wide angle end state to the telescopic end state.

In the interchangeable lens disclosed in JP-A-2003-241093 described above, the fourth lens group is fixed in the optical axis direction in order to reduce the travel of the first lens group. On the other hand, in a camera with a built-in lens system, it is advantageous to reduce the overall length of the lens system in the wide angle end state because off-axis light fluxes having passed through a first lens group shift toward the optical axis in the wide angle end state and hence the diameter of the lens system is readily reduced.

In consideration of this fact, in the variable focal length lens system in the first embodiment, the second lens group is fixed in the optical axis direction across the range from the wide angle end state to the telescopic end state. In this configuration, variable interlens distances can be increased while the number of movable lens groups is reduced and the configuration of the entire lens system is simplified, whereby both size reduction and a high variable power ratio can be achieved.

[1-2. Cross-Sectional Structure of Lens Barrel]

Figure 2:
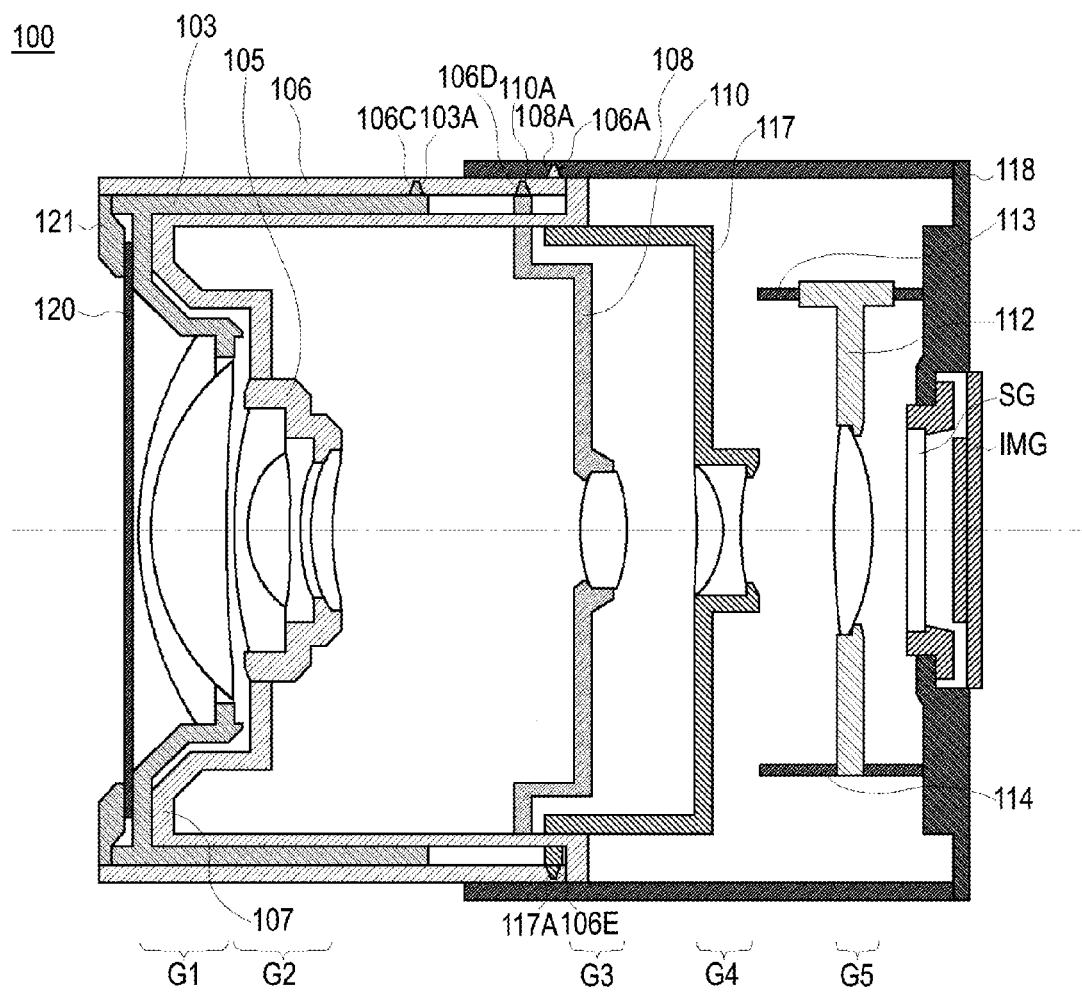
FIG. 2 is a diagrammatic cross-sectional view showing the overall configuration of the lens barrel (in a wide angle end state)

A description will subsequently be made of a drive mechanism as guiding means for driving the movable lens groups G1 to G5, which form the variable focal length lens system G described above, in the optical axis direction when the lens position setting is changed as shown in FIGS. 1 to 3 with reference to a lens barrel 100 in the first embodiment.

FIG. 1 shows the lens barrel 100 in the first embodiment in its collapsed state. FIG. 2 shows the lens barrel 100 in the wide angle end state. FIG. 3 shows the lens barrel 100 in the telescopic end state.

In the lens barrel 100 in the first embodiment, an imaging device unit IMG is attached to a disc-shaped, fixed base plate member 118, which is attached and fixed by screws (not shown) to a fixed tube 108 as a fixed frame disposed on the outermost circumferential side of the lens barrel 100.

The fixed tube 108 has a substantially cylindrical shape, and a cam 108A and a groove (not shown) for preventing a rectilinear guiding member 107 from rotating are formed on the inner circumferential side of the fixed tube 108.

A substantially cylindrical cam tube 106 is also disposed as a rotating frame on the inner circumferential side of the fixed tube 108. Rotating around the optical axis relative to the fixed tube 108, the cam tube 106 moves forward or backward in the optical axis direction relative to the fixed tube 108.

In this process, in the lens barrel 100 in the first embodiment, a protrusion (not shown) formed on the outer circumferential side of the rectilinear guiding member 107 engages with the groove (not shown) formed on the inner circumferential side of the fixed tube 108, preventing the rectilinear guiding member 107 from rotating when the cam tube 106 rotates.

A cam follower 106A is formed on the outer circumferential side of the cam tube 106, and concentric grooves (not shown) that engage with the rectilinear guiding member 107 are formed on the inner circumferential side of the cam tube 106. As a result, the cam tube 106 and the rectilinear guiding member 107 move as an integrated component.

The cam tube 106 has on its inner circumferential side a cam 106C that engages with a first lens group holding member 103, a cam 106D that engages with a third lens group holding member 110, and a cam 106E that engages with a fourth lens group holding member 117.

The rectilinear guiding member 107 as a rectilinear guiding frame has a substantially cylindrical shape disposed inside the cam tube 106, and holes (not shown) extending obliquely in the optical axis direction are formed in the circumferential side surface of the rectilinear guiding member 107. A cam follower 110A formed on the third lens group holding member 110 and a cam follower 117A formed on the fourth lens group holding member 117 pass through the holes.

In the lens barrel 100 in the first embodiment, the cam 106D in the cam tube 106 therefore engages with the cam follower 110A on the third lens group holding member 110 with the rectilinear guiding member 107 therebetween.

At the same time, in the lens barrel 100 in the first embodiment, the cam 107E in the cam tube 106 engages with the cam follower 117A on the fourth lens group holding member 117 with the rectilinear guiding member 107 therebetween.

In the lens barrel 100 in the first embodiment, the rectilinear guiding member 107 therefore prevents the third lens group holding member 110 and the fourth lens group holding member 117 from rotating when the cam tube 106 rotates.

The rectilinear guiding member 107 is configured not to rotate when the cam tube 106 rotates but shift in the optical axis direction integrally with the third lens group holding member 110 and the fourth lens group holding member 117.

As a result, in the lens barrel 100 in the first embodiment, the rectilinear guiding member 107, the third lens group holding member 110, and the fourth lens group holding member 117 do not rotate but move in the optical axis direction when the cam tube 106 rotates.

A second lens group holding member 105 that holds the second lens group G2 is attached to a central portion of the rectilinear guiding member 107, which fits into the cam tube 106 via an outer circumferential end portion of the rectilinear guiding member 107, whereby the rectilinear guiding member 107 moves in the optical axis direction integrally with the cam tube 106.

The rectilinear guiding member 107 fits into the cam tube 106 via the outer circumferential end portion of the rectilinear guiding member 107 but does not rotate when the cam tube 106 rotates, which means that the rectilinear guiding member 107 fits into the cam tube 106 but is not fixed thereto.

The first lens group holding member 103, which has a substantially cylindrical shape and holds the first lens group G1, is disposed between the cam tube 106 and the rectilinear guiding member 107, and the cam 106C in the cam tube 106 engages with a cam follower 103A formed on the first lens group holding member 103.

A groove (not shown) for preventing the first lens group holding member 103 from rotating is formed on the inner circumferential side of the cam tube 106. The groove engages with a protrusion formed on the outer circumferential side of the first lens group holding member 103.

As a result, in the lens barrel 100, the first lens group holding member 103 does not rotate but moves forward and backward in the optical axis direction when the cam tube 106 rotates.

Further, the fourth lens group holding member 117, which has a substantially cylindrical shape and holds the fourth lens group G4, is disposed on the inner circumferential side of the rectilinear guiding member 107, and the cam follower 117A formed on the outer circumferential side of the fourth lens group holding member 117 passes through one of the holes in the rectilinear guiding member 107 and engages with the cam 106E in the cam tube 106.

The third lens group holding member 110, which has a substantially cylindrical shape and holds the third lens group G3, is disposed on the inner circumferential side of the fourth lens group holding member 117 and on the side closer to an object than the fourth lens group holding member 117, and the cam follower 110A is formed on the outer circumferential side of the third lens group holding member 110.

The cam follower 110A on the third lens group holding member 110 passes through the other one of the holes in the rectilinear guiding member 107 and engages with the cam 106D in the cam tube 106.

Further, in the lens barrel 100 in the first embodiment, a fifth lens group holding member 112 that holds the fifth lens group G5 is disposed on the side closer to the image plane than the fourth lens group holding member 117. The fifth lens group holding member 112 is supported by a fifth lens group guiding shaft 113, and a fifth lens group rotation stopper 114 prevents the fifth lens group holding member 112 from rotating.

In the lens barrel 100 in the first embodiment, a cover 120 for protecting the first lens group G1 is disposed between an object and the first lens group holding member 103, and the cover 120 is attached to a cover holding member 121 provided at the front end of the cam tube 106.

FIGS. 4A to 4C describe the forward and backward action of the thus configured lens barrel 100 in the first embodiment in terms of the motion of the fixed tube 108, the cam tube 106, the rectilinear guiding member 107, the first lens group holding member 103, the second lens group holding member 105, the third lens group holding member 110, the fourth lens group holding member 117, and the fifth lens group holding member 112, which form the drive mechanism as the guiding means.

FIG. 4A shows the lens barrel 100 in the first embodiment in the collapsed state (FIG. 1), in which the lens barrel 100 retracts and an end of the rectilinear guiding member 107 is in contact with the fixed base plate member 118.

From the collapsed state of the lens barrel 100 in the first embodiment, the cam tube 106 moves in the optical axis direction toward the object side when the cam tube 106 is rotated.

In this process, in the lens barrel 100 in the first embodiment, since the rectilinear guiding member 107 prevents the third lens group holding member 110 and the fourth lens group holding member 117 from rotating, the cam followers 110A and 117A formed on the outer circumferential side of the third lens group holding member 110 and the fourth lens group holding member 117 move along the cams 106D and 106E formed on the inner circumferential side of the cam tube 106 when the cam tube 106 is rotated.

That is, in the lens barrel 100 in the first embodiment, when the cam tube 106 moves in the optical axis direction toward the object side while rotating relative to the fixed tube 108, the third lens group holding member 110 and the fourth lens group holding member 117 move toward the object side relative to the cam tube 106, and the lens barrel 100 transitions from the collapsed state (FIGS. 1 and 4A) to the wide angle end state (FIGS. 2 and 4B).

In this process, in the lens barrel 100 in the first embodiment, the first lens group holding member 103 sandwiched between the cam tube 106 and the rectilinear guiding member 107 also moves toward the object side integrally with the cam tube 106 and the rectilinear guiding member 107.

In the lens barrel 100 in the first embodiment, when the cam tube 106 is further rotated, the cam tube 106 does not move but only the first lens group holding member 103 moves toward the object side, and the third lens group holding member 110 and the fourth lens group holding member 117 move toward the object side. The lens position setting thus transitions from the wide angle end state (FIGS. 2 and 4B) to the telescopic end state (FIGS. 3 and 4C).

In the lens barrel 100 in the first embodiment, the rectilinear guiding member 107 integrated with the second lens group holding member 105 will not move when the lens position setting transitions from the wide angle end state (FIGS. 2 and 4B) to the telescopic end state (FIGS. 3 and 4C).

That is, in the lens barrel 100 in the first embodiment, the positional relationship between the fixed tube 108 and the cam tube 106 is the same in the wide angle end state (FIGS. 2 and 4B) and the telescopic end state (FIGS. 3 and 4C), and only the first lens group holding member 103 comes out of the cam tube 106 when the lens position setting transitions from the wide angle end state (FIGS. 2 and 4B) to the telescopic end state (FIGS. 3 and 4C).

The lens barrel 100 in the first embodiment is therefore configured to be what is called a two-stage system in which when the lens position setting transitions from the collapsed state (FIGS. 1 and 4A) to the wide angle end state (FIGS. 2 and 4B), the cam tube 106 comes out of the fixed tube 108, and when the lens position setting transitions from the wide angle end state (FIGS. 2 and 4B) to the telescopic end state (FIGS. 3 and 4C), the first lens group holding member 103 comes out of the cam tube 106.

The motion of the fifth lens group holding member 112 in the lens barrel 100, which moves independent of the rotation of the cam tube 106, will not be described in this section for convenience, and the states of the fifth lens group holding member 112 before and after it moves will also not be illustrated.

As described above, in the lens barrel 100 in the first embodiment, the rectilinear guiding member 107 is used not only to prevent the third lens group holding member 110 and the fourth lens group holding member 117 from rotating but also to hold the second lens group holding member 105.

The lens barrel 100 is thus configured to have an increased number of movable lens groups and achieve a high zoom ratio and high performance in a simplified barrel structure.

[1-3. Specific Configuration of Lens Barrel]

In the thus configured lens barrel 100 in the first embodiment, the variable focal length lens system G is desirably configured to satisfy the following conditional equation (1):

$$0.7 < TLw/TLt < 0.85 \tag{1}$$

where TLw represents the overall length of the lens system in the wide angle end state, and TLt represents the overall length of the lens system in the telescopic end state.

The conditional equation (1) defines the change in the overall length of the lens system that occurs when the lens position setting is changed, that is, the conditional equation (1) determines how much the first lens group holding member 103 can be extended.

When TLw/TLt is greater than the upper limit of the conditional equation (1), the first lens group holding member 103 becomes thicker in the optical axis direction, resulting in an increased barrel thickness at the time when the lens system retracts.

As a result, in the lens barrel 100 in the first embodiment, the barrel thickness at the time when the lens system retracts is not thin enough, and sufficient size reduction will not be achieved.

When TLw/TLt is smaller than the lower limit of the conditional equation (1), the cam tube 106 and the fixed tube 108 become thicker in the optical axis direction by the amount corresponding to the decrease in thickness of the first lens group holding member 103 in the optical axis direction.

As a result, in the lens barrel 100 in the first embodiment, when TLw/TLt is smaller than the lower limit of the conditional equation (1), the barrel thickness at the time when the lens system retracts is not thin enough, and sufficient size reduction will not be achieved.

Further, in the lens barrel 100 in the first embodiment, the variable focal length lens system G is desirably configured to satisfy the following conditional equations (2) and (3):

$$0.2 < \Delta 3/TLt < 0.4 \tag{2}$$

$$0.05 < \Delta 4/TLt < 0.2 \tag{3}$$

where $\Delta 3$ represents how much the third lens group travels when the lens position setting is changed from the wide angle end state to the telescopic end state, and $\Delta 4$ represents how much the fourth lens group travels when the lens position setting is changed from the wide angle end state to the telescopic end state.

The conditional equations (2) and (3) respectively define how much the third and fourth lens groups travel when the lens position setting is changed. When $\Delta 3/TLt$ is smaller than the lower limit of the conditional equation (2), the effect of the third lens group G3 on changing the magnification of the lens system is insufficient.

As a result, in the lens barrel 100 in the first embodiment, the effect of the second lens group G2 in the variable focal length lens system G on changing the magnification of the lens system is instead increased to provide a predetermined variable power ratio. In this case, it is difficult to correct the change in axial aberrations in a satisfactory manner induced in the second lens group G2 when the lens position setting is changed.

Conversely, when $\Delta 3/TLt$ is greater than the upper limit of the conditional equation (2), the travel of the third lens holding member 110 increases. As a result, in the lens barrel 100 in the first embodiment, the cam 106D in the cam tube 106 needs to extend in the optical axis direction, which causes the cam 106D to mechanically interfere with the other cams 106C and 106E. To prevent the interference, the cam tube 106 inevitably needs to be thicker in the optical axis direction, resulting in an increased thickness of the lens barrel 100 in the collapsed state in which the lens system retracts.

When $\Delta 4/TLt$ is smaller than the lower limit of the conditional equation (3), off-axis light fluxes having passed through the fourth lens group G4 greatly shift away from the optical axis in the telescopic end state. As a result, in the lens barrel 100 in the first embodiment, change in off-axis aberrations induced in the fourth lens group G4 due to the change in angular field of view may not be corrected in a satisfactory manner, resulting in no further improvement in the optical performance.

Conversely, when Δ4/TLt is greater than the upper limit of the conditional equation (3), the lateral magnification of the fourth lens group G4 in the telescopic end state increases in the positive direction. As a result, an image formed by the first lens group G1 to the third lens group G3 is greatly magnified. In this case, the optical performance may significantly decrease even when any of the first lens group G1 to the third lens group G3 is slightly decentered in a manufacturing process.

In the lens barrel 100 in the first embodiment, it is more preferable that the following conditional equation (4) as well as the conditional equations (2) and (3) are satisfied.

$$\Delta 4/\Delta 3 < 0.9 \quad (4)$$

When Δ4/Δ3 is greater than the upper limit of the conditional equation (4), the cam follower 110A on the third lens holding member 110 and the cam follower 117A on the fourth lens holding member 117 interfere with each other in the telescopic end state. As a result, the cam tube 106 inevitably needs to be thicker in the optical axis direction, resulting in an increased barrel thickness.

Further, in the variable focal length lens system G in the lens barrel 100 in the first embodiment, an aperture diaphragm is desirably disposed in the vicinity of the third lens group G3 in order to reduce the effective lens diameter in each of the lens groups so that change in off-axis aberrations that occurs when the lens position setting is changed is corrected in a satisfactory manner.

In general, when the lens position setting is changed, the height of off-axis light fluxes passing through each of the lens groups tends to change as the number of lens groups the distance from which to the aperture diaphragm changes increases. The change in the height is used to correct the change in off-axis aberrations that occurs when the lens position setting is changed, and the correction can be made in a more satisfactory manner by intentionally changing the height of off-axis light fluxes.

In particular, in the variable focal length lens system G in the lens barrel 100 in the first embodiment, when an aperture diaphragm is disposed in the vicinity of the third lens group G3, a plurality of movable lens groups can be disposed upstream and downstream of the aperture diaphragm in a well balanced manner, whereby comma aberration can be corrected in a more satisfactory manner and the performance of the lens system is enhanced accordingly.

Further, in the variable focal length lens system G in the lens barrel 100 in the first embodiment, since the third lens group G3 is positioned in the vicinity of the center of the overall lens system, the aperture diaphragm is also positioned in the vicinity of the center of the overall lens system, whereby the off-axis light fluxes passing through each of the lens groups will not greatly shift away from the optical axis. As a result, the lens diameter can be reduced.

In the variable focal length lens system G in the lens barrel 100 in the first embodiment, the lens diameter can be further reduced and the barrel structure can be simplified by disposing the aperture diaphragm on the object side of the third lens group G3 and integrally moving the aperture diaphragm and the third lens group G3 when the lens position setting is changed.

In the variable focal length lens system G in the lens barrel 100 in the first embodiment, disposing the aperture diaphragm on the object side of the third lens group G3 allows the height of the off-axis light fluxes having passed through the first lens group G1 from the optical axis to be reduced particularly in the wide angle end state, whereby the size of the lens system can be reduced.

At the same time, in the variable focal length lens system G in the lens barrel 100 in the first embodiment, since the off-axis light fluxes having passed through the first lens group G1 shift toward the optical axis in the wide angle end state, comma aberration that appears in the periphery of the screen can be suppressed and the performance of the lens system can be enhanced accordingly.

To change a state in which a subject located at an infinite distance is brought into focus to a state in which a subject located at a near distance is brought into focus (hereinafter referred to as proximity focusing), it is desirable in the variable focal length lens system G in the lens barrel 100 in the first embodiment that the fifth lens group G5 is moved in the optical axis direction.

The reason for this is that the fifth lens group G5 is disposed in a position close to the image plane position and axial light fluxes and off-axis light fluxes passing through the fifth lens group G5 are spaced apart from each other, whereby the axial light fluxes and the off-axis light fluxes can be corrected independently. The fifth lens group G5 is thus suitably used to correct change in off-axis aberrations that occurs when the subject position changes.

Further, in the variable focal length lens system G in the lens barrel 100 in the first embodiment, the following conditional equation (5) is desirably satisfied to reduce the lens diameter and shorten the overall length of the lens system in a well balanced manner:

$$1.8 < fl/(fw \times ft)^{1/2} < 2.7 \quad (5)$$

where fl represents the focal length of the first lens group, fw represents the focal length of the overall lens system in the wide angle end state, and ft represents the focal length of the overall lens system in the telescopic end state.

The conditional equation (5) defines the focal length fl of the first lens group G1. When $fl/(fw \times ft)^{1/2}$ is greater than the upper limit of the conditional equation (5), light fluxes passing through the first lens group G1 less converges in the variable focal length lens system G in the lens barrel 100 in the first embodiment, resulting in an increased overall length of the lens system in the telescopic end state.

Conversely, when $fl/(fw \times ft)^{1/2}$ is smaller than the lower limit of the conditional equation (5), light fluxes passing through the first lens group G1 more converges in the variable focal length lens system G in the lens barrel 100 in the first embodiment, resulting in an increased lens diameter because off-axis light fluxes in the wide angle end state shift away from the optical axis.

On the other hand, when the refracting power of the first lens group G1 increases, higher-order spherical aberrations induced in the first lens group alone in the telescopic end state may not be corrected in a satisfactory manner. In this case, it is conceivable that a variable aperture diaphragm is used and the size of the full aperture is changed when the lens position setting is changed, which however, for example, increases noise when a low-illuminance subject is imaged.

In consideration of this fact, it is desirable in the variable focal length lens system G in the lens barrel 100 in the first embodiment that the lower limit of the conditional equation (5) is set to "2.0" to correct the higher-order spherical aberrations induced in the first lens group G1 alone in a more satisfactory manner so that the full-aperture f-number decreases in the telescopic end state.

In the variable focal length lens system G in the lens barrel 100 in the first embodiment, using an aspheric lens allows much higher optical performance to be achieved. In particular, in the variable focal length lens system G in the lens barrel 100 in the first embodiment, using an aspheric lens in the second lens group G2 allows change in comma aberration induced when the angular field of view is changed in the wide angle end state to be corrected in a satisfactory manner.

Further, in the variable focal length lens system G in the lens barrel 100 in the first embodiment, introducing an aspheric lens in any of the third lens group G3 to the fifth lens group G5 allows the performance at the center of the lens system to be further enhanced.

Moreover, in the variable focal length lens system G in the lens barrel 100 in the first embodiment, using a plurality of aspheric surfaces in any of the lens groups, of course, allows the optical performance of the lens system to be further enhanced.

Further, in the variable focal length lens system G in the lens barrel 100 in the first embodiment, to correct spherical aberration induced in the first lens group G1 alone so that excellent optical performance is achieved particularly in the telescopic end state, the first lens group G1 is desirably a doublet formed of a negative lens having a concave surface facing the image side and a positive lens having a convex surface facing the object side.

The doublet can be replaced with separate negative and positive lenses. In this case, color aberration and spherical aberration induced in the first lens group G1 can be corrected in a satisfactory manner in the variable focal length lens system G in the lens barrel 100 in the first embodiment.

When separate negative and positive lenses are used in the variable focal length lens system G in the lens barrel 100 in the first embodiment, however, even a slight amount of decentering of any of the positive and negative lenses in a manufacturing process significantly degrades the optical performance. A doublet is therefore desirable.

In addition, in the variable focal length lens system G in the lens barrel 100 in the first embodiment, an image can be shifted by shifting one of the lens groups that form the lens system or part of the lenses that form any of the lens groups in a direction substantially perpendicular to the optical axis.

In the variable focal length lens system G in the lens barrel 100 in the first embodiment, a detection system for detecting inclination of the camera, an computation system for computing the amount of inclination based on image shift information from the detection system, and a drive system for shifting a predetermined lens in accordance with the information on the amount of inclination from the computation system are combined with the predetermined lens.

In the thus configured variable focal length lens system G in the lens barrel 100 in the first embodiment, image shift due to camera shaking that may occur when a shutter release button is pressed can be canceled or reduced by shifting the predetermined lens.

In particular, in the variable focal length lens system G in the lens barrel 100 in the first embodiment, degradation in performance that occurs when the third lens group G3 is shifted in a direction substantially perpendicular to the optical axis can be reduced.

Further, in the variable focal length lens system G in the lens barrel 100 in the first embodiment, when an aperture diaphragm is disposed in the vicinity of the third lens group G3, off-axis light fluxes pass through a paraxial region. It is therefore possible to suppress change in off-axis aberrations induced when the third lens group G3 is shifted in a direction substantially perpendicular to the optical axis.

In the variable focal length lens system G in the lens barrel 100 in the first embodiment, it is, of course, possible to dispose a low-pass filter for preventing what is called moire fringes from being produced on the image side of the lens system and an infrared blocking filter in accordance with the spectral sensitivity characteristic of the light receiving device in the imaging device unit IMG.

[2. Numerical Examples Corresponding to First Embodiment]

Numerical examples in which specific values are used in the variable focal length lens system. G in the lens barrel 100 in the first embodiment will be described below with reference to the drawings and tables. In the following numerical examples, an aspheric surface is expressed by the following equation (1).

$$x=cy^2/(1+(1-(1+k)c^2y^2)^{1/2})+Ay^4+By^6+\ldots \quad (1)$$

In the equation, y represents the height from the optical axis, x represents the amount of sag, c represents curvature, k represents a conic constant, and A, B, . . . represent aspheric coefficients.

Figure 5:
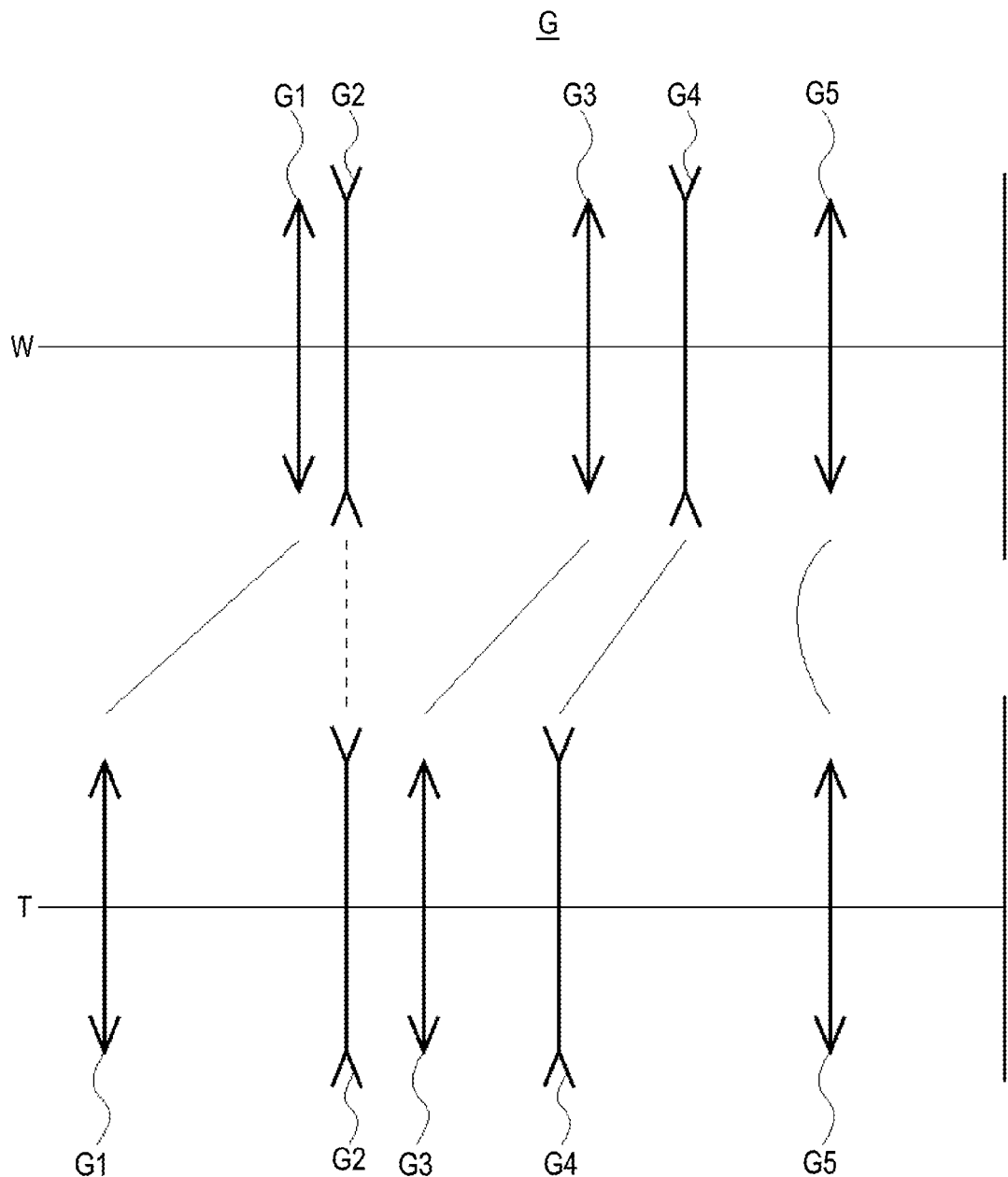
FIG. 5 is a diagram showing the arrangement of refracting power in a variable focal length lens system corresponding to first and second numerical examples.

FIG. 5 shows the arrangement of refracting power in the variable focal length lens system G used in the lens barrel 100 in the first embodiment and corresponding to first and second numerical examples.

The variable focal length lens system G is formed of a first lens group G1 having positive refracting power, a second lens group G2 having negative refracting power, a third lens group G3 having positive refracting power, a fourth lens group G4 having negative refracting power, and a fifth lens group G5 having positive refracting power arranged in this order from the object side.

In the variable focal length lens system G, when the magnification is changed from the value in the wide angle end state to the value in the telescopic end state, air separation between the first lens group G1 and the second lens group G2 increases, air separation between the second lens group G2 and the third lens group G3 decreases, and air separation between the third lens group G3 and the fourth lens group G4 increases.

In this process, in the variable focal length lens system G, the first lens group G1, the third lens group G3 and the fourth lens group G4 move toward the object side, the second lens group G2 is fixed in the optical axis direction, and the fifth lens group G5 moves in such a way that change in image plane position that occurs when the lens groups move is compensated and moves toward the object side when the proximity focusing is carried out.

[2-1. First Numerical Example]

In FIG. 6, reference number 11 denotes the variable focal length lens system G as a whole used in the lens barrel 100 in the first embodiment and corresponding to the first numerical example. The variable focal length lens system G includes the first lens group G1 having positive refracting power, the second lens group G2 having negative refracting power, the third lens group G3 having positive refracting power, the fourth lens group G4 having negative refracting power, and the fifth lens group G5 having positive refracting power arranged in this order from the object side.

In the variable focal length lens system 11, the first lens group G1 is a doublet L1 formed of a meniscus negative lens having a convex surface facing the object side and a positive lens having a convex surface facing the object side.

In the variable focal length lens system 11, the second lens group G2 is formed of a meniscus negative lens L21 having a concave surface facing the image side, a negative lens L22 having concave surfaces on both sides, and a meniscus positive lens L23 having a convex surface facing the object side.

In the variable focal length lens system 11, the third lens group G3 is formed of a positive lens L3 having convex surfaces on both sides, and the fourth lens group G4 is a doublet L4 formed of a meniscus positive lens having a concave surface facing the object side and a meniscus negative lens having a concave surface facing the object side.

In the variable focal length lens system 11, the fifth lens group G5 is formed of a positive lens L5 having convex surfaces on both sides.

In the variable focal length lens system 11, an aperture diaphragm S is disposed in the vicinity of the third lens group G3 and on the object side thereof, and a seal glass plate SG for protecting the imaging device unit IMG is disposed between the fifth lens group G5 and the imaging device unit IMG.

In the variable focal length lens system 11 in the first numerical example, a high variable power ratio and a wide angular field of view can be achieved and aberrations of the lens system can be corrected in a satisfactory manner by employing the lens element configuration described above.

Table 1 below shows data in the first numerical example. In the data table in the first numerical example, f represents the focal length, FNO represents the f-number, 2ω represents the angular field of view, and the refractive indices are values corresponding to the d line (wavelength of 587.6 nm). In Table 1, a radius of curvature of zero stands for a flat surface.

TABLE 1

Data in first numerical example
f: ranging from 1.00 to 3.12 to 6.59
F NO: ranging from 3.52 to 5.55 to 6.35
2ω: ranging from 74.14 to 26.74 to 12.63°

| Surface number | Radius of curvature | Intersurface distance | Refractive index | Abbe number |
|---|---|---|---|---|
| 1 | 3.3019 | 0.117 | 1.92286 | 20.80 |
| 2 | 1.9925 | 0.702 | 1.83500 | 42.98 |
| 3 | 13.2532 | (D3) | | |
| 4 | 12.6520 | 0.126 | 1.88300 | 40.80 |
| 5 | 1.1873 | 0.402 | | |
| 6 | −5.1283 | 0.087 | 1.72317 | 53.86 |
| 7 | 1.7476 | 0.106 | | |
| 8 | 1.5905 | 0.191 | 1.94595 | 17.98 |
| 9 | 2.8885 | (D9) | | |
| 10 (aperture diaphragm) | 0.0000 | 0.194 | | |
| 11 | 1.5651 | 0.431 | 1.59201 | 67.05 |
| 12 | −1.8863 | (D12) | | |
| 13 | −5.9528 | 0.313 | 1.88515 | 39.50 |
| 14 | −0.6803 | 0.107 | 1.75520 | 27.53 |
| 15 | 2.5339 | (D15) | | |
| 16 | 9.4104 | 0.348 | 1.61800 | 63.39 |
| 17 | −2.2171 | (D17) | | |
| 18 | 0.0000 | 0.181 | 1.51633 | 64.20 |
| 19 | 0.0000 | (Bf) | | |

The fourth, fifth, eleventh, twelfth, fifteenth, and sixteenth surfaces are aspheric surfaces, and the aspheric coefficients thereof are shown in Table 2. For example, 0.26029E−05 means $0.26029 \times 10^{-5}$.

TABLE 2

| | | Aspheric coefficients in first numerical example | | | |
|---|---|---|---|---|---|
| Fourth surface | κ = 0.0000 | A = 0.150416E+00 | B = −0.475468E−01 | C = 0.317622E−02 | D = −0.419138E−02 |
| Fifth surface | κ = 0.9046 | A = 0.146891E+00 | B = 0.502663E−01 | C = 0.413334E+00 | D = −0.426043E−01 |
| Eleventh surface | κ = −1.1038 | A = −0.826855E−01 | B = −0.438730E−01 | C = 0.420582E−01 | D = 0.000000E+00 |
| Twelfth surface | κ = 0.0000 | A = −0.230199E−01 | B = 0.000000E+00 | C = 0.000000E+00 | D = 0.000000E+00 |
| Fifteenth surface | κ = 0.0000 | A = 0.225214E+00 | B = 0.665918E−01 | C = 0.748884E+00 | D = 0.000000E+00 |
| Sixteenth surface | κ = 0.0000 | A = −0.158512E−01 | B = 0.320069E−01 | C = −0.136418E−01 | D = 0.000000E+00 |

Table 3 below shows variable distances that change when the lens position setting is changed in the variable focal length lens system 11 in the first numerical example.

TABLE 3

Variable distances in first numerical example

| f | 1.000 | 3.117 | 6.592 |
|---|---|---|---|
| D3 | 0.078 | 1.275 | 2.204 |
| D9 | 2.082 | 0.882 | 0.291 |
| D13 | 0.691 | 1.041 | 1.432 |
| D16 | 0.979 | 2.092 | 2.263 |
| D18 | 0.290 | 0.026 | 0.056 |
| BF | 0.274 | 0.274 | 0.274 |

Table 4 below shows values used in the conditional equations in the variable focal length lens system 11 used in the lens barrel 100 and corresponding to the first numerical example.

TABLE 4

Values used in conditional equations in first numerical example
f1 = 5.559

(1) TLw/TLt = 0.784
(2) Δ3/TLt = 0.183
(3) Δ4/TLt = 0.107
(4) Δ4/Δ3 = 0.586
(5) f1/(fw × ft)$^{1/2}$ = 2.165

Figure 7A:
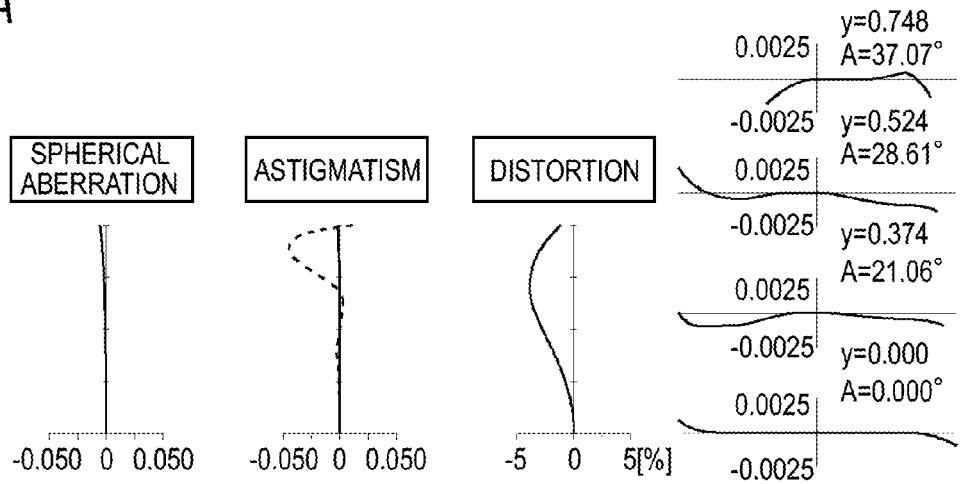
FIGS. 7A to 7C show characteristic curves illustrating aberrations in the first numerical example.
Figure 7B:
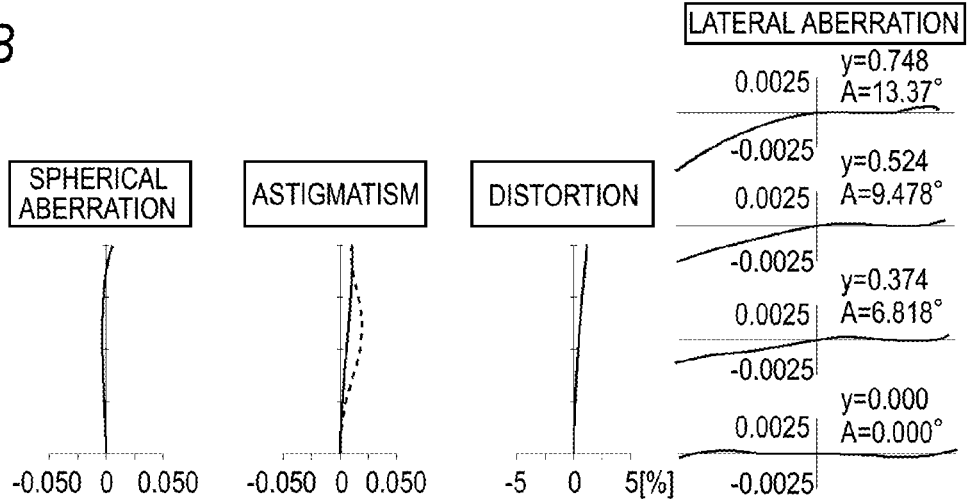
Figure 7C:
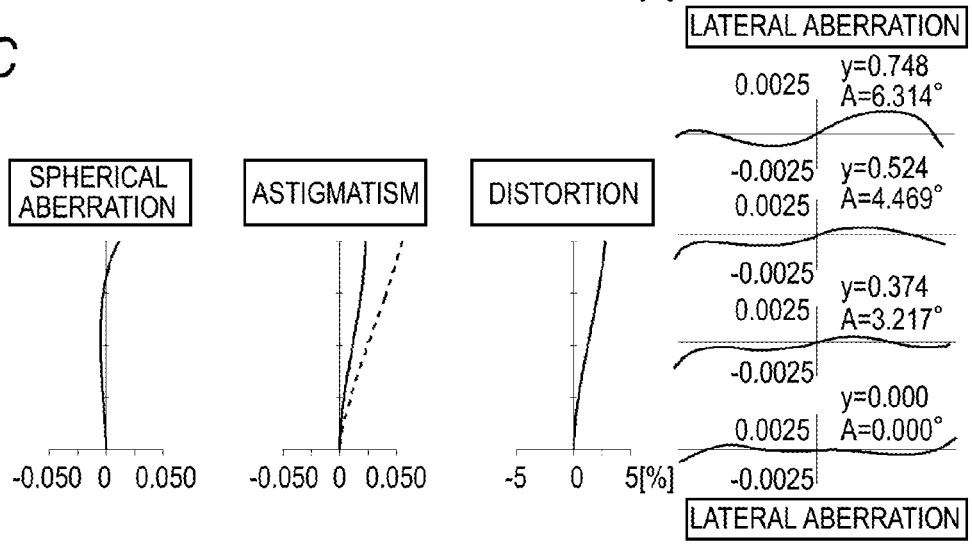

FIGS. 7A to 7C show aberration diagrams in a state in which an infinite point is brought into focus in the first numerical example. FIG. 7A shows aberration diagrams in the wide angle end state (f=1.000). FIG. 7B shows aberration diagrams in an intermediate focal length state (f=3.117). FIG. 7C shows aberration diagrams in the telescopic end state (f=6.592).

In FIGS. 7A to 7C, the solid line in each spherical aberration diagram represents spherical aberration. The solid line and the broken line in each astigmatism diagram represent astigmatism in the sagittal image plane and the meridional image plane, respectively. The solid line in each distortion diagram represents distortion. Reference characters A and y in each lateral aberration diagram represent the angular field of view and the image height, respectively. It is obvious from the aberration diagrams that the aberrations are corrected in a satisfactory manner and imaging performance is excellent in the variable focal length lens system 11 used in the lens barrel 100 and corresponding to the first numerical example.

[2-2. Second Numerical Example]

In FIG. 8, reference number 12 denotes the variable focal length lens system G as a whole used in the lens barrel 100 in the first embodiment and corresponding to a second numerical example. The variable focal length lens system G includes the first lens group G1 having positive refracting power, the second lens group G2 having negative refracting power, the third lens group G3 having positive refracting power, the fourth lens group G4 having negative refracting power, and the fifth lens group G5 having positive refracting power arranged in this order from the object side.

In the variable focal length lens system 12, the first lens group G1 is a doublet L1 formed of a meniscus negative lens having a convex surface facing the object side and a positive lens having a convex surface facing the object side.

In the variable focal length lens system 12, the second lens group G2 is formed of a meniscus negative lens L21 having a concave surface facing the image side, a negative lens L22 having concave surfaces on both sides, and a meniscus positive lens L23 having a convex surface facing the object side.

In the variable focal length lens system 12, the third lens group G3 is formed of a positive lens L3 having convex surfaces on both sides, and the fourth lens group G4 is a doublet L4 formed of a meniscus positive lens having a concave surface facing the object side and a meniscus negative lens having a concave surface facing the object side.

In the variable focal length lens system 12, the fifth lens group G5 is formed of a positive lens L5 having convex surfaces on both sides.

In the variable focal length lens system 12, an aperture diaphragm S is disposed in the vicinity of the third lens group G3 and on the object side thereof, and an IR blocking filter CF and a seal glass plate SG for protecting the imaging device unit IMG are disposed between the fifth lens group G5 and the imaging device unit IMG.

In the variable focal length lens system 12 in the second numerical example, a high variable power ratio and a wide angular field of view are achieved and aberrations of the lens system can be corrected in a satisfactory manner by employing the lens element configuration described above.

Table 5 below shows data in the second numerical example. In the data table in the second numerical example, f represents the focal length, FNO represents the f-number, 2ω represents the angular field of view, and the refractive indices are values corresponding to the d line (wavelength of 587.6 nm). In Table 5, a radius of curvature of zero stands for a flat surface.

TABLE 5

Data in second numerical example
f: ranging from 1.00 to 2.43 to 5.65
F NO: ranging from 3.51 to 4.61 to 5.36
2ω: ranging from 76.44 to 33.81 to 14.58°

| Surface number | Radius of curvature | Intersurface distance | Refractive index | Abbe number |
|---|---|---|---|---|
| 1 | 3.0714 | 0.117 | 1.92286 | 20.80 |
| 2 | 1.8622 | 0.688 | 1.83500 | 42.98 |
| 3 | 11.8814 | (D3) | | |
| 4 | 3.8787 | 0.126 | 1.88300 | 40.80 |
| 5 | 0.8935 | 0.370 | | |
| 6 | −5.1604 | 0.087 | 1.75500 | 52.30 |
| 7 | 1.7476 | 0.106 | | |
| 8 | 1.6441 | 0.186 | 1.94595 | 17.98 |
| 9 | 3.3666 | (D9) | | |
| 10 (aperture diaphragm) | 0.0000 | 0.408 | | |
| 11 | 1.5001 | 0.485 | 1.59201 | 67.05 |
| 12 | −1.7442 | (D12) | | |
| 13 | −6.4928 | 0.326 | 1.88300 | 40.80 |
| 14 | −0.7160 | 0.107 | 1.75520 | 27.53 |
| 15 | 2.5339 | (D15) | | |
| 16 | 5.8347 | 0.347 | 1.61800 | 63.39 |
| 17 | −2.6796 | (D17) | | |
| 18 | 0.0000 | 0.181 | 1.51633 | 64.20 |
| 19 | 0.0000 | (Bf) | | |

The fifth, eleventh, twelfth, fifteenth, and sixteenth surfaces are aspheric surfaces, and the aspheric coefficients thereof are shown in Table 6. For example, 0.26029E-05 means 0.26029×10$^{-5}$.

TABLE 6

Aspheric coefficients in second numerical example

| Surface | κ | A | B | C | D |
|---|---|---|---|---|---|
| Fifth surface | κ = 0.3279 | A = −0.327493E−01 | B = −0.148551E+00 | C = 0.419734E+00 | D = −0.950325E+00 |
| Eleventh surface | κ = −0.9846 | A = −0.975931E−01 | B = −0.631318E−01 | C = 0.102016E+00 | D = 0.000000E+00 |
| Twelfth surface | κ = 0.0000 | A = −0.250704E−01 | B = 0.000000E+00 | C = 0.000000E+00 | D = 0.000000E+00 |
| Fifteenth surface | κ = 0.0000 | A = 0.226151E+00 | B = 0.137797E+00 | C = 0.395054E+00 | D = 0.000000E+00 |
| Sixteenth surface | κ = 0.0000 | A = 0.219957E−03 | B = 0.380373E−01 | C = −0.197005E−01 | D = 0.000000E+00 |

Table 7 below shows variable distances that change when the lens position setting is changed in the variable focal length lens system 12 in the lens barrel 100.

TABLE 7

Variable distances in second numerical example

| | | | |
|---|---|---|---|
| f | 1.000 | 2.525 | 5.651 |
| D3 | 0.078 | 1.047 | 2.016 |
| D9 | 1.580 | 0.680 | 0.036 |
| D13 | 0.606 | 0.843 | 1.270 |
| D16 | 0.929 | 1.700 | 1.918 |
| D18 | 0.302 | 0.194 | 0.194 |
| Bf | 0.274 | 0.274 | 0.274 |

Table 8 below shows values used in the conditional equations in the variable focal length lens system 12 used in the lens barrel 100 and corresponding to the second numerical example.

TABLE 8

Values used in conditional equations in second numerical example
f1 = 5.213

(1) TLw/TLt = 0.795
(2) Δ3/TLt = 0.168
(3) Δ4/TLt = 0.089
(4) Δ4/Δ3 = 0.531
(5) f1/(fw × ft)$^{1/2}$ = 2.193

Figure 9A:
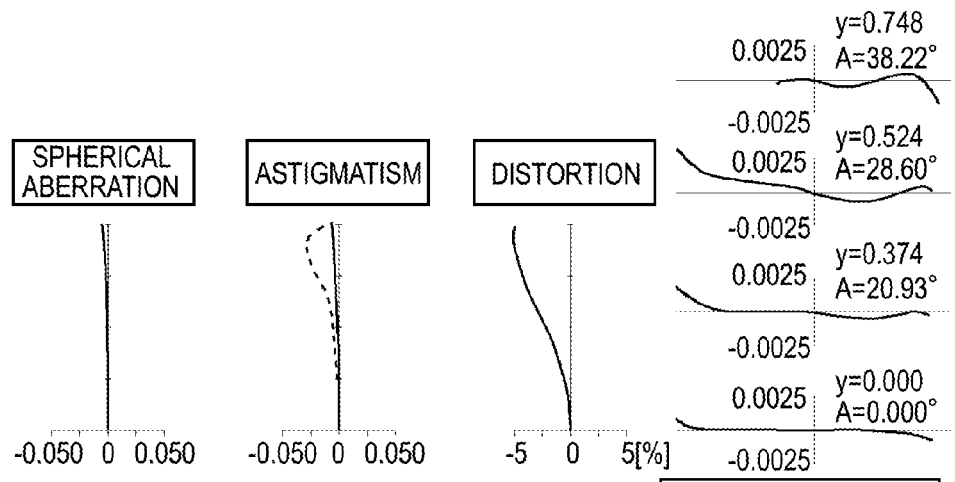
FIGS. 9A to 9C show characteristic curves illustrating aberrations in the second numerical example.
Figure 9B:
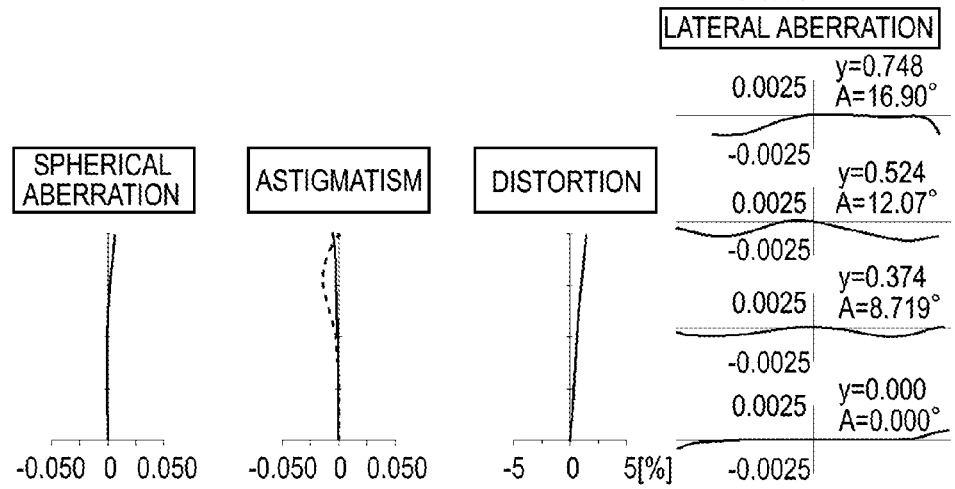
Figure 9C:
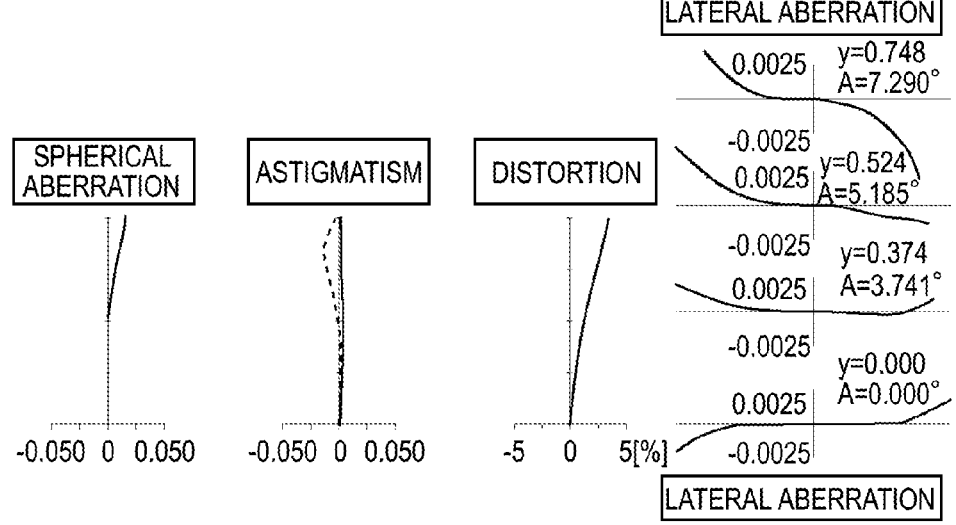

FIGS. 9A to 9C show aberration diagrams in a state in which an infinite point is brought into focus in the second numerical example. FIG. 9A shows aberration diagrams in the wide angle end state (f=1.000). FIG. 9B shows aberration diagrams in an intermediate focal length state (f=2.525). FIG. 9C shows aberration diagrams in the telescopic end state (f=5.651).

In FIGS. 9A to 9C, the solid line in each spherical aberration diagram represents spherical aberration. The solid line and the broken line in each astigmatism diagram represent astigmatism in the sagittal image plane and the meridional image plane, respectively. The solid line in each distortion diagram represents distortion. Reference characters A and y in each lateral aberration diagram represent the angular field of view and the image height, respectively. It is obvious from the aberration diagrams that the aberrations are corrected in a satisfactory manner and imaging performance is excellent in the variable focal length lens system 12 used in the lens barrel 100 and corresponding to the second numerical example.

<3. Second Embodiment>
[3-1. Configuration of Lens Barrel]

A lens barrel in a second embodiment also includes a variable focal length lens system having at least three movable lens groups and a drive mechanism as guiding means for moving each of the lens groups that form the variable focal length lens system forward and backward in the optical axis direction.

A description will first be made of the configuration of the variable focal length lens system in the second embodiment. The variable focal length lens system is formed of five lens groups, a first lens group having positive refracting power, a second lens group having negative refracting power, a third lens group having positive refracting power, a fourth lens group having negative refracting power, and a fifth lens group having positive refracting power arranged in this order from the object side.

Specifically, in the variable focal length lens system in the second embodiment, when the lens position setting is changed from the wide angle end state in which the focal length of the lens system has the smallest value to the telescopic end state in which the focal length has the greatest value, air separation between the first and second lens groups increases, air separation between the second and third lens groups decreases, air separation between the third and fourth lens groups increases, and air separation between the fourth and fifth lens groups decreases.

At the same time, in the variable focal length lens system in the second embodiment, the first lens group monotonically moves toward the object side, the second lens group slightly moves in the optical axis direction, and the third and fourth lens groups move toward the object side.

Further, in the variable focal length lens system in the second embodiment, the fifth lens group is separately driven and moved in such a way that change in image plane position that occurs when the first, second, third, and fourth lens groups move in the optical axis direction is compensated.

The function of each of the lens groups that form the variable focal length lens system in the second embodiment will next be described. In the variable focal length lens system in the second embodiment, the first and second lens groups are disposed close to each other in the wide angle end state.

As a result, in the variable focal length lens system in the second embodiment, off-axis light fluxes incident on the first lens group shift toward the optical axis, whereby the lens diameter of the first lens group can be reduced.

In practice, in the variable focal length lens system in the second embodiment, the air separation between the first and second lens groups increases when the lens position setting is changed from the wide angle end state to the telescopic end state, and off-axis light fluxes having passed through the first lens group shift away from the optical axis.

In the variable focal length lens system in the second embodiment, however, the change in height of off-axis light fluxes with respect to the optical axis can be used to correct change in off-axis aberrations in a satisfactory manner that occurs when the lens position setting is changed. In particular, in the variable focal length lens system in the second embodiment, the aberration correction effect is enhanced by increasing the change in the overall length of the lens system to further increase the change in height of off-axis light fluxes with respect to the optical axis.

Further, in the variable focal length lens system in the second embodiment, the air separation between the second and third lens groups is increased in the wide angle end state so that off-axis light fluxes having passed through the second lens group shift away from the optical axis. As a result, axial aberrations and off-axis aberrations can be corrected independently.

Further, in the variable focal length lens system in the second embodiment, the distance between the second and third lens groups is reduced when the lens position setting is changed from the wide angle end state to the telescopic end state, whereby off-axis light fluxes having passed through the second lens group shift toward the optical axis. Therefore, in the variable focal length lens system in the second embodiment, the change in height of off-axis light fluxes can be used to correct change in off-axis aberrations in a satisfactory manner that occurs when the lens position setting is changed, whereby the performance of the lens system can be improved.

Further, in the variable focal length lens system in the second embodiment, the third and fourth lens groups are disposed close to each other in the wide angle end state so that off-axis light fluxes having passed through the fourth lens group shift away from the optical axis, whereby change in off-axis aberrations due to the change in angular field of view is corrected in a satisfactory manner.

At the same time, in the variable focal length lens system in the second embodiment, the air separation between the third and fourth lens groups is increased when the lens position setting is changed from the wide angle end state to the telescopic end state so that off-axis light fluxes having passed through the fourth lens group shift toward the optical axis. As a result, in the variable focal length lens system in the second embodiment, change in off-axis aberrations due to the change in the lens position setting can be corrected in a satisfactory manner.

In the variable focal length lens system in the second embodiment, in which the fourth lens group having negative refracting power and the fifth lens group having positive refracting power are disposed on the image plane side of the third lens group, the second and fourth lens groups, each of which is a negative lens group, are disposed upstream and downstream of an aperture diaphragm, respectively. The arrangement of refracting power across the lens system is therefore nearly symmetric with respect to the aperture diaphragm, and negative distortion that tends to occur particularly in the wide angle end state is thus corrected in a satisfactory manner.

The fifth lens group is moved primarily in such a way that change in image plane position that occurs when the lens groups move is compensated. In the variable focal length lens system in the second embodiment, the air separation between the fourth and fifth lens groups is increased by moving the fourth lens group toward the object side when the lens position setting is changed from the wide angle end state to the telescopic end state.

As a result, in the variable focal length lens system in the second embodiment, off-axis light fluxes having passed through the fifth lens group shift away from the optical axis. The change in height of the off-axis light fluxes can be used to correct change in off-axis aberrations due to the change in angular field of view in a more satisfactory manner.

[3-2. Cross-Sectional Structure of Lens Barrel]

A drive mechanism for driving movable lens groups G1 to G5 that form a variable focal length lens system G', (which will be described later) in which the second lens group is not fixed in the optical axis direction, in the optical axis direction when the lens position setting is changed is basically the same as the drive mechanism in the lens barrel 100 shown in FIGS. 1 to 3, and the description of the drive mechanism is omitted for convenience.

[3-3. Specific Configuration of Lens Barrel]

The variable focal length lens system G' incorporated in the lens barrel 100 in the second embodiment is desirably configured to satisfy the following conditional equation (1) as in the variable focal length lens system G in the first embodiment:

$$0.7 < TLw/TLt < 0.85 \qquad (1)$$

where TLw represents the overall length of the lens system in the wide angle end state, and TLt represents the overall length of the lens system in the telescopic end state.

The conditional equation (1) defines the change in the overall length of the lens system that occurs when the lens position setting is changed, that is, the conditional equation (1) determines how much the first lens group holding member 103 can be extended.

When TLw/TLt is greater than the upper limit of the conditional equation (1), the first lens group holding member 103 becomes thicker in the optical axis direction, resulting in an increased barrel thickness at the time when the lens system retracts.

As a result, in the lens barrel 100 in the second embodiment, the barrel thickness at the time when the lens system retracts is not thin enough, and sufficient size reduction will not be achieved.

When TLw/TLt is smaller than the lower limit of the conditional equation (1), the cam tube 106 and the fixed tube 108 become thicker in the optical axis direction by the amount corresponding to the decrease in thickness of the first lens group holding member 103 in the optical axis direction.

As a result, in the lens barrel 100 in the second embodiment, when TLw/TLt is smaller than the lower limit of the conditional equation (1), the barrel thickness at the time when the lens system retracts is not thin enough, and sufficient size reduction will not be achieved.

Further, in the lens barrel 100 in the second embodiment, the variable focal length lens system G' is desirably configured to satisfy the following conditional equations (2) and (3):

$$0.2 < \Delta 3/TLt < 0.4 \qquad (2)$$

$$0.05 < \Delta 4/TLt < 0.2 \qquad (3)$$

where $\Delta 3$ represents how much the third lens group travels when the lens position setting is changed from the wide angle end state to the telescopic end state, and $\Delta 4$ represents how much the fourth lens group travels when the lens position setting is changed from the wide angle end state to the telescopic end state.

The conditional equations (2) and (3) respectively define how much the third and fourth lens groups travel when the lens position setting is changed. When $\Delta 3/TLt$ is smaller than the lower limit of the conditional equation (2), the effect of the third lens group G3 on changing the magnification of the lens system is insufficient.

As a result, in the lens barrel 100 in the second embodiment, the effect of the second lens group G2 in the variable focal length lens system G' on changing the magnification of the lens system is instead increased to provide a predetermined variable power ratio. In this case, it is difficult to correct the change in axial aberrations in a satisfactory manner induced in the second lens group G2 when the lens position setting is changed.

Conversely, when Δ3/TLt is greater than the upper limit of the conditional equation (2), the travel of the third lens holding member 110 increases. As a result, in the lens barrel 100 in the second embodiment, the cam 106D in the cam tube 106 needs to extend in the optical axis direction, which causes the cam 106D to mechanically interfere with the other cams 106C and 106E. To prevent the interference, the cam tube 106 inevitably needs to be thicker in the optical axis direction, resulting in an increased thickness of the lens barrel 100 in the collapsed state in which the lens system retracts.

When Δ4/TLt is smaller than the lower limit of the conditional equation (3), off-axis light fluxes having passed through the fourth lens group G4 greatly shift away from the optical axis in the telescopic end state because the fourth lens group G4 moves only slightly.

As a result, in the lens barrel 100 in the second embodiment, change in off-axis aberrations induced in the fourth lens group G4 due to the change in angular field of view may not be corrected in a satisfactory manner, resulting in no further improvement in the optical performance.

Conversely, when Δ4/TLt is greater than the upper limit of the conditional equation (3), the lateral magnification of the fourth lens group G4 in the telescopic end state increases in the positive direction. As a result, an image formed by the first lens group G1 to the third lens group G3 is greatly magnified. In this case, the optical performance may significantly decrease even when any of the first lens group G1 to the third lens group G3 is slightly decentered in a manufacturing process.

In the lens barrel 100 in the second embodiment, it is more preferable that the following conditional equation (4) as well as the conditional equations (2) and (3) are satisfied.

$$\Delta 4/\Delta 3 < 0.9 \quad (4)$$

When Δ4/Δ3 is greater than the upper limit of the conditional equation (4), the cam follower 110A on the third lens holding member 110 and the cam follower 117A on the fourth lens holding member 117 interfere with each other in the telescopic end state. As a result, the cam tube 106 inevitably needs to be thicker in the optical axis direction, resulting in an increased barrel thickness.

Further, in the variable focal length lens system G' in the lens barrel 100 in the second embodiment, an aperture diaphragm is desirably disposed in the vicinity of the third lens group G3 in order to reduce the effective lens diameter in each of the lens groups so that change in off-axis aberrations that occurs when the lens position setting is changed is corrected in a satisfactory manner.

In general, when the lens position setting is changed, the height of off-axis light fluxes passing through each of the lens groups tends to change as the number of lens groups the distance from which to the aperture diaphragm changes increases. The change in the height is used to correct the change in off-axis aberrations that occurs when the lens position setting is changed, and the correction can be made in a more satisfactory manner by intentionally changing the height of off-axis light fluxes.

In particular, in the variable focal length lens system G' in the lens barrel 100 in the second embodiment, when an aperture diaphragm is disposed in the vicinity of the third lens group G3, a plurality of movable lens groups can be disposed upstream and downstream of the aperture diaphragm in a well balanced manner, whereby comma aberration can be corrected in a more satisfactory manner and the performance of the lens system is enhanced accordingly.

Further, in the variable focal length lens system G' in the lens barrel 100 in the second embodiment, since the third lens group G3 is positioned in the vicinity of the center of the overall lens system, the aperture diaphragm is also positioned in the vicinity of the center of the overall lens system, whereby the off-axis light fluxes passing through each of the lens groups will not greatly shift away from the optical axis. As a result, the lens diameter can be reduced.

In the variable focal length lens system G' in the lens barrel 100 in the second embodiment, the lens diameter can be further reduced and the barrel structure can be simplified by disposing the aperture diaphragm on the object side of the third lens group G3 and integrally moving the aperture diaphragm and the third lens group G3 when the lens position setting is changed.

In the variable focal length lens system G' in the lens barrel 100 in the second embodiment, disposing the aperture diaphragm on the object side of the third lens group G3 allows the height of the off-axis light fluxes having passed through the first lens group G1 from the optical axis to be reduced particularly in the wide angle end state, whereby the size of the lens system can be reduced.

At the same time, in the variable focal length lens system G' in the lens barrel 100 in the second embodiment, since the off-axis light fluxes having passed through the first lens group G1 shift toward the optical axis in the wide angle end state, comma aberration that appears in the periphery of the screen can be suppressed and the performance of the lens system can be enhanced accordingly.

In the proximity focusing, in which a state in which a subject located at an infinite distance is brought into focus is changed to a state in which a subject located at a near distance is brought into focus, it is desirable in the variable focal length lens system G' in the lens barrel 100 in the second embodiment that the fifth lens group G5 is moved in the optical axis direction.

The reason for this is that the fifth lens group G5 is disposed in a position close to the image plane position and axial light fluxes and off-axis light fluxes passing through the fifth lens group are spaced apart from each other, whereby the axial light fluxes and the off-axis light fluxes can be corrected independently. The fifth lens group G5 is thus suitably used to correct change in off-axis aberrations that occurs when the subject position changes.

Further, in the variable focal length lens system G' in the lens barrel 100 in the second embodiment, the following conditional equation (5) is desirably satisfied to reduce the lens diameter and shorten the overall length of the lens system in a well balanced manner:

$$1.8 < fl/(fw \times ft)^{1/2} < 2.7 \quad (5)$$

where fl represents the focal length of the first lens group, fw represents the focal length of the overall lens system in the wide angle end state, and ft represents the focal length of the overall lens system in the telescopic end state.

The conditional equation (5) defines the focal length fl of the first lens group G1. When $fl/(fw \times ft)^{1/2}$ is greater than the upper limit of the conditional equation (5), light fluxes passing through the first lens group G1 less converges in the variable focal length lens system G' in the lens barrel 100 in the second embodiment, resulting in an increased overall length of the lens system in the telescopic end state.

Conversely, when $fl/(fw \times ft)^{1/2}$ is smaller than the lower limit of the conditional equation (5), light fluxes passing through the first lens group G1 more converges in the variable focal length lens system G' in the lens barrel 100 in the second embodiment, resulting in an increased lens diameter because off-axis light fluxes in the wide angle end state shift away from the optical axis.

On the other hand, when the refracting power of the first lens group G1 increases, higher-order spherical aberrations induced in the first lens group alone in the telescopic end state may not be corrected in a satisfactory manner. In this case, it is conceivable that a variable aperture diaphragm is used and the size of the full aperture is changed when the lens position setting is changed, which however, for example, increases noise when a low-illuminance subject is imaged.

In consideration of this fact, it is desirable in the variable focal length lens system G' in the lens barrel 100 in the second embodiment that the lower limit of the conditional equation (5) is set to "2.0" to correct the higher-order spherical aberrations induced in the first lens group alone in a more satisfactory manner so that the full-aperture f-number decreases in the telescopic end state.

In the variable focal length lens system G' in the lens barrel 100 in the second embodiment, using an aspheric lens allows much higher optical performance to be achieved. In particular, in the variable focal length lens system G' in the lens barrel 100 in the second embodiment, using an aspheric lens in the second lens group G2 allows change in comma aberration induced when the angular field of view is changed in the wide angle end state to be corrected in a satisfactory manner.

Further, in the variable focal length lens system G' in the lens barrel 100 in the second embodiment, introducing an aspheric lens in any of the third lens group G3 to the fifth lens group G5 allows the performance at the center of the lens system to be further enhanced. Moreover, in the variable focal length lens system G' in the lens barrel 100 in the second embodiment, using a plurality of aspheric surfaces in any of the lens groups, of course, allows the optical performance of the lens system to be further enhanced.

Further, in the variable focal length lens system G' in the lens barrel 100 in the second embodiment, to correct spherical aberration induced in the first lens group alone so that excellent optical performance is achieved particularly in the telescopic end state, the first lens group G1 is desirably a doublet formed of a negative lens having a concave surface facing the image side and a positive lens having a convex surface facing the object side.

The doublet can be replaced with separate negative and positive lenses, whereby color aberration and spherical aberration induced in the first lens group G1 can be corrected in a satisfactory manner in the variable focal length lens system G' in the lens barrel 100 in the second embodiment.

When separate negative and positive lenses are used in the variable focal length lens system G' in the lens barrel 100 in the second embodiment, however, even a slight amount of decentering of any of the negative and positive lenses in a manufacturing process significantly degrades the optical performance. A doublet is therefore desirable.

In addition, in the variable focal length lens system G' in the lens barrel 100 in the second embodiment, an image can be shifted by shifting one of the lens groups that form the lens system or part of the lenses that form any of the lens groups in a direction substantially perpendicular to the optical axis.

In the variable focal length lens system G' in the lens barrel 100 in the second embodiment, a detection system for detecting inclination of the camera, an computation system for computing the amount of inclination based on image shift information from the detection system, a drive system for shifting a predetermined lens in accordance with the information on the amount of inclination from the computation system are combined with the predetermined lens.

In the thus configured variable focal length lens system G' in the lens barrel 100 in the second embodiment, image shift due to camera shaking that may occur when a shutter release button is pressed can be canceled or reduced by shifting the predetermined lens.

In particular, in the variable focal length lens system G' in the lens barrel 100 in the second embodiment, degradation in performance that occurs when the third lens group G3 is shifted in a direction substantially perpendicular to the optical axis can be reduced.

Further, in the variable focal length lens system G' in the lens barrel 100 in the second embodiment, when an aperture diaphragm is disposed in the vicinity of the third lens group G3, off-axis light fluxes pass through a paraxial region. It is therefore possible to suppress change in off-axis aberrations that occurs when the third lens group G3 is shifted in a direction substantially perpendicular to the optical axis.

In the variable focal length lens system G' in the lens barrel 100 in the second embodiment, it is, of course, possible to dispose a low-pass filter for preventing what is called moire fringes from being produced on the image side of the lens system and an infrared blocking filter in accordance with the spectral sensitivity characteristic of the light receiving device in the imaging device unit IMG.

<4. Numerical Example Corresponding to Second Embodiment>

A numerical example in which specific values are used in the variable focal length lens system G' in the lens barrel 100 in the second embodiment will be described below with reference to the drawings and tables. In the following numerical example, an aspheric surface is expressed by the equation 1 described above.

Figure 10:
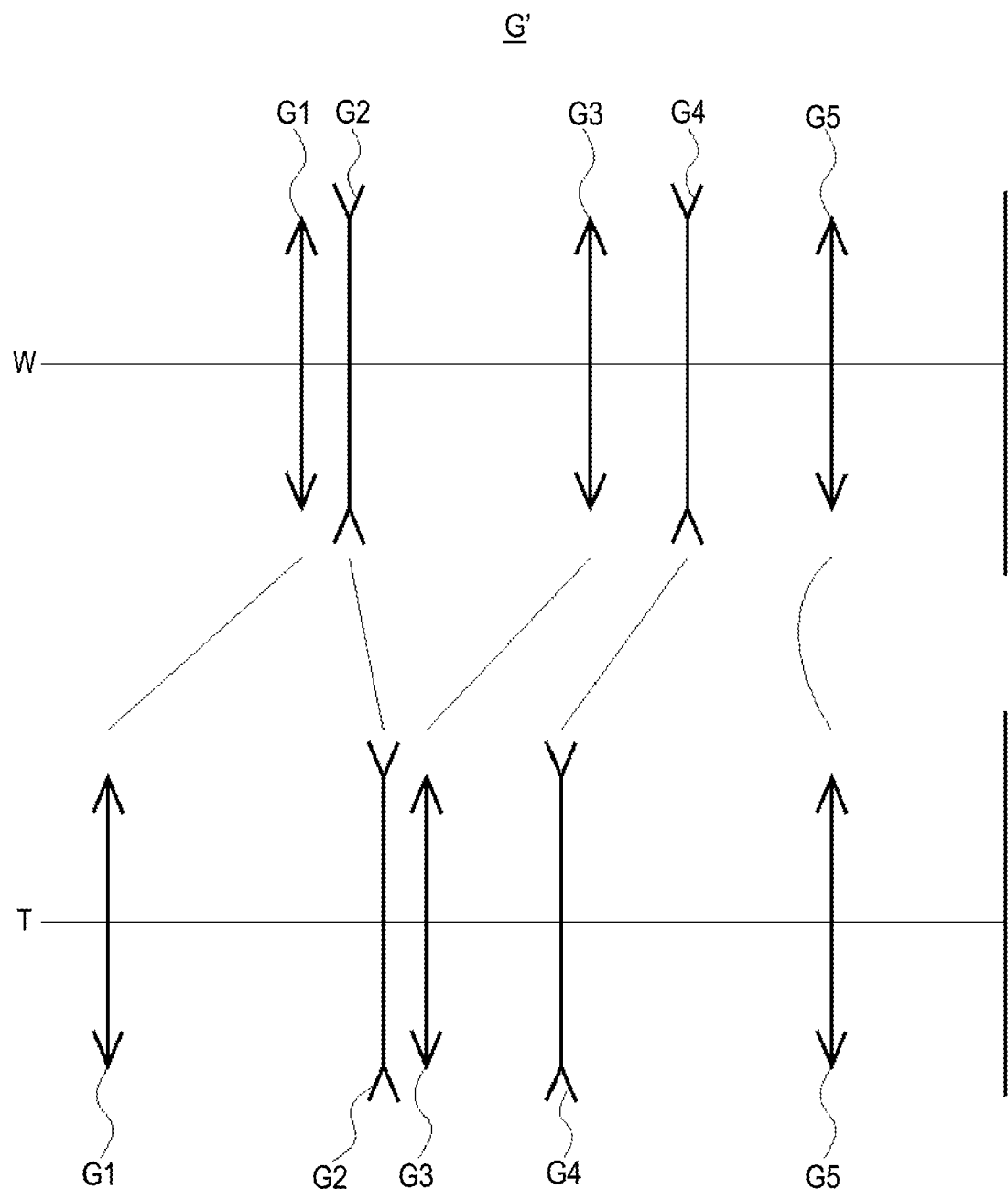
FIG. 10 is a diagram showing the arrangement of refracting power in a variable focal length lens system corresponding to a third numerical example.

FIG. 10 shows the arrangement of refracting power in the variable focal length lens system G' used in the lens barrel 100 in the second embodiment and corresponding to a third numerical example.

The variable focal length lens system G' is formed of a first lens group G1 having positive refracting power, a second lens group G2 having negative refracting power, a third lens group G3 having positive refracting power, a fourth lens group G4 having negative refracting power, and a fifth lens group G5 having positive refracting power arranged in this order from the object side.

In the variable focal length lens system G', when the magnification is changed from the value in the wide angle end state to the value in the telescopic end state, air separation between the first lens group G1 and the second lens group G2 increases, air separation between the second lens group G2 and the third lens group G3 decreases, and air separation between the third lens group G3 and the fourth lens group G4 increases.

In this process, in the variable focal length lens system G', the first lens group G1, the third lens group G3, and the fourth lens group G4 move toward the object side, the second lens group G2 also slightly shifts in the optical axis direction, and the fifth lens group G5 moves in such a way that change in image plane position that occurs when the lens groups move is compensated and moves toward the object side when the proximity focusing is carried out.

[4-1. Third Numerical Example]

In FIG. 11, reference number 13 denotes the variable focal length lens system G' as a whole used in the lens barrel 100 in the second embodiment and corresponding to a third numerical example. The variable focal length lens system G' includes the first lens group G1 having positive refracting power, the second lens group G2 having negative refracting power, the third lens group G3 having positive refracting power, the fourth lens group G4 having negative refracting power, and the fifth lens group G5 having positive refracting power arranged in this order from the object side.

In the variable focal length lens system 13, the first lens group G1 is a doublet L1 formed of a meniscus negative lens having a convex surface facing the object side and a positive lens having a convex surface facing the object side.

In the variable focal length lens system 13, the second lens group G2 is formed of a meniscus negative lens L21 having a concave surface facing the image side, a negative lens L22 having concave surfaces on both sides, and a meniscus positive lens L23 having a convex surface facing the object side.

In the variable focal length lens system 13, the third lens group G3 is a positive doublet L3 formed of a positive lens having convex surfaces on both sides and a meniscus negative lens having a concave surface facing the object side.

In the variable focal length lens system 13, the fourth lens group G4 is formed of a meniscus negative lens L4 having a convex surface facing the object side.

In the variable focal length lens system 13, the fifth lens group G5 is formed of a positive lens L5 having convex surfaces on both sides.

In the variable focal length lens system 13, an aperture diaphragm S is disposed in the vicinity of the third lens group G3 and on the object side thereof, and an IR blocking filter CF and a seal glass plate SG for protecting the imaging device unit IMG are disposed between the fifth lens group G5 and the imaging device unit IMG.

In the variable focal length lens system 13 in the lens barrel 100 in the second embodiment, a high variable power ratio and a wide angular field of view can be achieved and aberrations of the lens system are corrected in a satisfactory manner by employing the lens element configuration described above.

Table 9 below shows data in the third numerical example. In the data table in the third numerical example, f represents the focal length, FNO represents the f-number, $2\omega$ represents the angular field of view, and the refractive indices are values corresponding to the d line (wavelength of 587.6 nm). In Table 9, a radius of curvature of zero stands for a flat surface.

TABLE 9

Data in third numerical example
f: ranging from 1.00 to 3.01 to 9.64
F NO: ranging from 3.58 to 4.72 to 6.03
$2\omega$: ranging from 76.15 to 25.49 to 7.65°

| Surface number | Radius of curvature | Intersurface distance | Refractive index | Abbe number |
|---|---|---|---|---|
| 1 | 3.8069 | 0.136 | 2.00069 | 25.46 |
| 2 | 2.3952 | 0.636 | 1.81600 | 46.62 |
| 3 | 20.2496 | (D3) | | |
| 4 | 96.9648 | 0.136 | 1.88300 | 40.80 |
| 5 | 1.5771 | 0.455 | | |
| 6 | −2.7875 | 0.087 | 1.62041 | 60.34 |
| 7 | 2.3335 | 0.039 | | |
| 8 | 1.9912 | 0.225 | 1.94595 | 17.98 |
| 9 | 5.3905 | (D9) | | |
| 10 (aperture diaphragm) | 0.0000 | 0.116 | | |
| 11 | 2.0031 | 0.679 | 1.60300 | 65.44 |
| 12 | −0.9547 | 0.078 | 1.64769 | 33.79 |
| 13 | −1.8934 | (D13) | | |
| 14 | 3.3759 | 0.097 | 1.90366 | 31.13 |
| 15 | 1.7454 | (D15) | | |
| 16 | 3.1029 | 0.388 | 1.61800 | 63.33 |
| 17 | −193.9296 | (D17) | | |
| 18 | 0.0000 | 0.180 | 1.51633 | 64.20 |
| 19 | 0.0000 | (Bf) | | |

The fourth, fifth, eleventh, sixteenth, and seventeenth surfaces are aspheric surfaces, and the aspheric coefficients thereof are shown in Table 10. For example, 0.26029E−05 means $0.26029 \times 10^{-5}$.

TABLE 10

Aspheric coefficients in third numerical example

| | | | | | |
|---|---|---|---|---|---|
| Fourth surface | κ = 0.0000 | A = 0.106725E+00 | B = −0.333964E−01 | C = 0.000000E+00 | D = 0.000000E+00 |
| Fifth surface | κ = −3.0760 | A = 0.237374E+00 | B = 0.459625E−01 | C = 0.944233E−01 | D = 0.135489E−01 |
| Eleventh surface | κ = −4.8602 | A = 0.182836E−02 | B = 0.172622E−01 | C = −0.128234E+00 | D = 0.227588E+00 |
| Sixteenth surface | κ = 0.0751 | A = −0.655331E−00 | B = −0.737788E−01 | C = −0.470040E−01 | D = 0.471690E−02 |
| Seventeenth surface | κ = 0.0000 | A = −0.752774E−01 | B = −0.907662E−01 | C = 0.000000E+00 | D = 0.000000E+00 |

Table 11 below shows variable distances that change when the lens position setting is changed in the variable focal length lens system 13 in the lens barrel 100.

TABLE 11

Variable distances in third numerical example

| f | 1.000 | 3.005 | 9.645 |
|---|---|---|---|
| D3 | 0.068 | 1.654 | 3.302 |
| D9 | 3.442 | 1.409 | 0.332 |
| D13 | 0.585 | 0.538 | 0.986 |
| D15 | 1.083 | 1.931 | 3.061 |
| D17 | 0.767 | 1.514 | 0.663 |
| Bf | 0.140 | 0.140 | 0.140 |

Table 12 below shows values used in the conditional equations in the variable focal length lens system 13 used in the lens barrel 100 and corresponding to the third numerical example.

TABLE 12

Values used in conditional equations in third numerical example
f1 = 6.658

(1) TLw/TLt = 0.796
(2) Δ3/TLt = 0.194
(3) Δ4/TLt = 0.160
(4) Δ4/Δ3 = 0.824
(5) f1/(fw × ft)$^{1/2}$ = 2.144

Figure 12A:
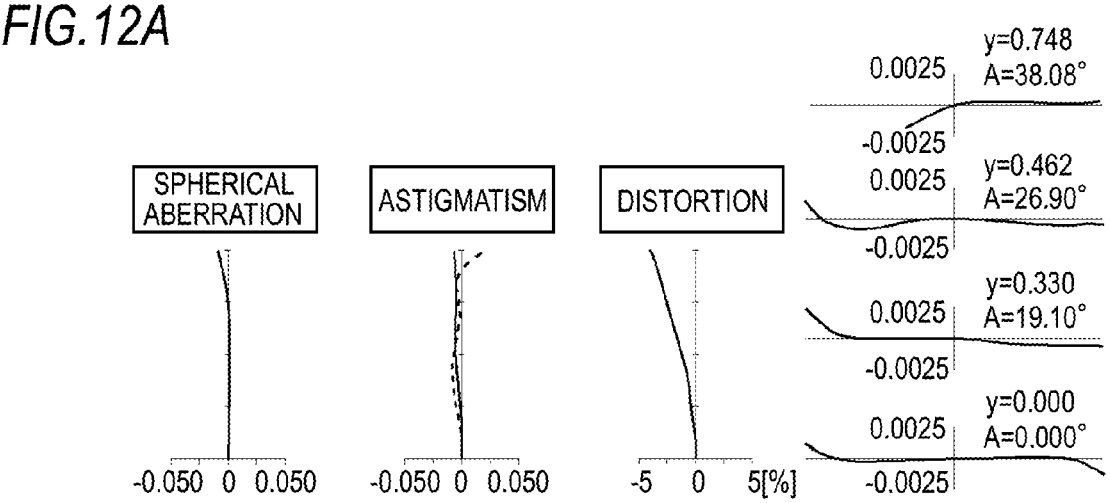
FIGS. 12A to 12C show characteristic curves illustrating aberrations in the third numerical example.
Figure 12B:
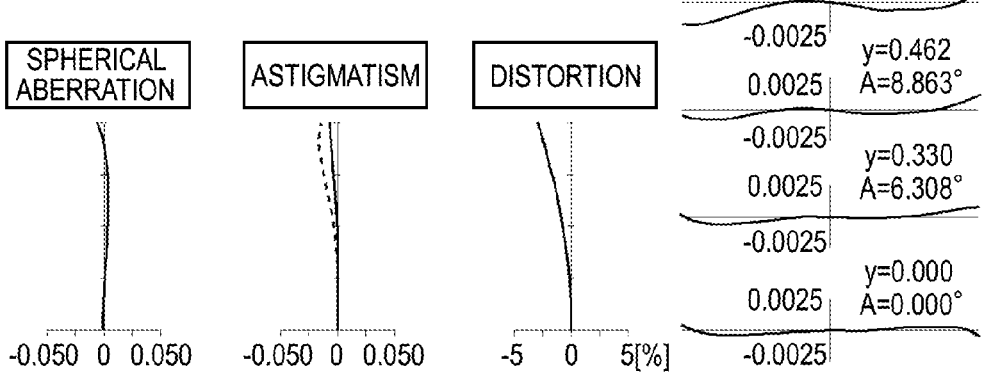
Figure 12C:
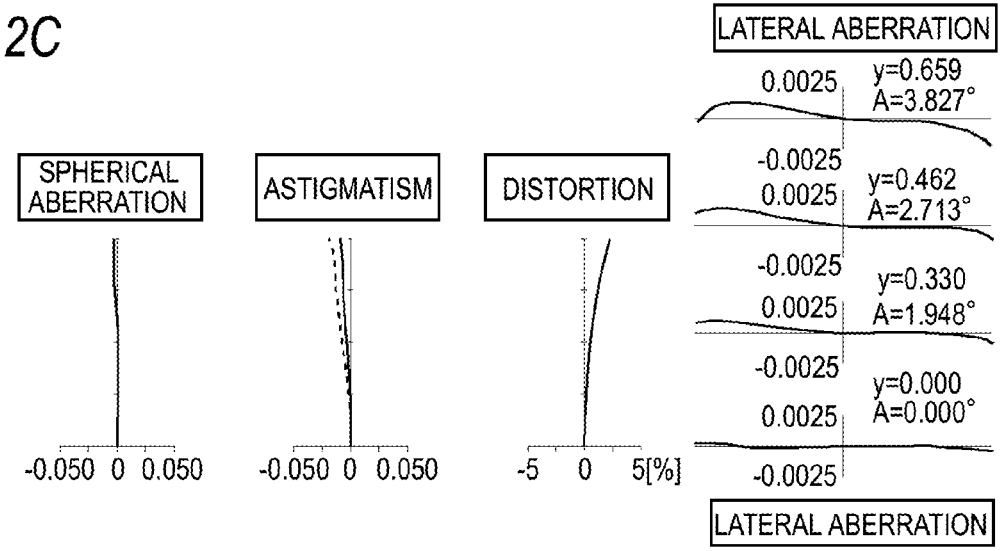

FIGS. 12A to 12C show aberration diagrams in a state in which an infinite point is brought into focus in the third numerical example. FIG. 12A shows aberration diagrams in the wide angle end state (f=1.000). FIG. 12B shows aberration diagrams in an intermediate focal length state (f=3.005). FIG. 12C shows aberration diagrams in the telescopic end state (f=9.645).

In FIGS. 12A to 12C, the solid line in each spherical aberration diagram represents spherical aberration. The solid line and the broken line in each astigmatism diagram represent astigmatism in the sagittal image plane and the meridional image plane, respectively. The solid line in each distortion diagram represents distortion. Reference characters A and y in each lateral aberration diagram represent the angular field of view and the image height, respectively. It is obvious from the aberration diagrams that the aberrations are corrected in a satisfactory manner and imaging performance is excellent in the variable focal length lens system 13 in the third numerical example.

<5. Configurations of Imaging Apparatus and Digital Still Camera>

[5-1. Configuration of Imaging Apparatus]

An imaging apparatus according to an embodiment of the invention will next be described. As shown in FIG. 13, an imaging apparatus 200 includes the variable focal length lens system 11 (or 12, 13) in the lens barrel 100 corresponding to the first or second embodiment and the imaging device unit IMG formed, for example, of a CCD (Charge Coupled Device) sensor or a CMOS (Complementary Metal Oxide Semiconductor) sensor for converting an optical image formed by the variable focal length lens system 11 into an electric signal.

The following description will be described assuming that the variable focal length lens system 11 in the lens barrel 100 corresponding to the first embodiment is incorporated in the imaging apparatus 200.

The variable focal length lens system 11 (FIGS. 1 and 6) in the lens barrel 100 includes the first lens group G1 having positive refracting power, the second lens group G2 having negative refracting power, the third lens group G3 having positive refracting power, the fourth lens group G4 having negative refracting power, and the fifth lens group G5 having positive refracting power arranged in this order from the object side.

Specifically, in the variable focal length lens system 11 in the imaging apparatus 200, when the lens position setting is changed from the wide angle end state where the focal length of the lens system has the smallest value to the telescopic end state where the focal length has the greatest value, air separation between the first lens group G1 and the second lens group G2 increases, air separation between the second lens group G2 and the third lens group G3 decreases, air separation between the third lens group G3 and the fourth lens group G4 increases, and air separation between the fourth lens group G4 and the fifth lens group G5 decreases.

At the same time, in the variable focal length lens system 11 in the imaging apparatus 200, the first lens group G1 monotonically moves toward the object side, the second lens group G2 is fixed in the optical axis direction, and the third lens group G3 and the fourth lens group G4 move toward the object side.

Further, in the variable focal length lens system 11 in the imaging apparatus 200, the fifth lens group G5 is separately driven and moved in such a way that change in image plane position that occurs when the first lens group G1, the third lens group G3, and the fourth lens group G4 move in the optical axis direction is compensated.

The function of each of the lens groups that form the variable focal length lens system 11 in the imaging apparatus 200 will next be described. In the variable focal length lens system 11 in the imaging apparatus 200, the first lens group G1 and the second lens group G2 are disposed close to each other in the wide angle end state.

As a result, in the variable focal length lens system 11 in the imaging apparatus 200, off-axis light fluxes incident on the first lens group G1 shift toward the optical axis, whereby the lens diameter of the first lens group G1 can be reduced.

In practice, in the variable focal length lens system 11 in the imaging apparatus 200, the air separation between the first lens group G1 and the second lens group G2 increases when the lens position setting is changed from the wide angle end state to the telescopic end state, and off-axis light fluxes having passed through the first lens group G1 shift away from the optical axis.

Therefore, in the variable focal length lens system 11 in the imaging apparatus 200, the change in height of off-axis light fluxes with respect to the optical axis can be used to correct change in off-axis aberrations in a satisfactory manner that occurs when the lens position setting is changed. In particular, in the variable focal length lens system 11 in the imaging apparatus 200, the aberration correction effect is enhanced by increasing the change in the overall length of the lens system to further increase the change in height of off-axis light fluxes with respect to the optical axis.

Further, in the variable focal length lens system 11 in the imaging apparatus 200, the air separation between the second lens group G2 and the third lens group G3 is increased in the wide angle end state so that off-axis light fluxes having passed through the second lens group G2 shift away from the optical axis. As a result, axial aberrations and off-axis aberrations can be corrected independently.

Further, in the variable focal length lens system 11 in the imaging apparatus 200, the distance between the second lens group G2 and the third lens group G3 is reduced when the lens position setting is changed from the wide angle end state to the telescopic end state, whereby off-axis light fluxes having passed through the second lens group G2 shift toward the optical axis. Therefore, in the variable focal length lens system 11 in the imaging apparatus 200, the change in height of off-axis light fluxes can be used to correct change in off-axis aberrations in a satisfactory manner that occurs when the lens position setting is changed, whereby the performance of the lens system can be improved.

Further, in the variable focal length lens system 11 in the imaging apparatus 200, the third lens group G3 and the fourth lens group G4 are disposed close to each other in the wide angle end state so that off-axis light fluxes having passed through the fourth lens group G4 shift away from the optical axis, whereby change in off-axis aberrations due to the change in angular field of view is corrected in a satisfactory manner.

At the same time, in the variable focal length lens system 11 in the imaging apparatus 200, the air separation between the third lens group G3 and the fourth lens group G4 is increased when the lens position setting is changed from the wide angle end state to the telescopic end state so that off-axis light fluxes having passed through the fourth lens group G4 shift toward the optical axis. As a result, in the variable focal length lens system 11 in the imaging apparatus 200, change in off-axis aberrations due to the change in the lens position setting can be corrected in a satisfactory manner.

In the variable focal length lens system 11 in the imaging apparatus 200, in which the fourth lens group G4 having negative refracting power and the fifth lens group G5 having positive refracting power are disposed on the image plane side of the third lens group G3, the second lens group G2 and the fourth lens group G4, each of which is a negative lens group, are disposed upstream and downstream of an aperture diaphragm, respectively. The arrangement of refracting power across the lens system is therefore nearly symmetric with respect to the aperture diaphragm, and negative distortion that tends to occur particularly in the wide angle end state is thus corrected in a satisfactory manner.

The fifth lens group G5 is moved primarily in such a way that change in image plane position that occurs when the lens groups move is compensated. In the variable focal length lens system 11 in the imaging apparatus 200, the air separation between the fourth lens group G4 and the fifth lens group G5 is increased by moving the fourth lens group G4 toward the object side when the lens position setting is changed from the wide angle end state to the telescopic end state.

As a result, in the variable focal length lens system 11 in the imaging apparatus 200, off-axis light fluxes having passed through the fifth lens group G5 shift away from the optical axis. The change in height of the off-axis light fluxes can be used to correct change in off-axis aberrations due to the change in angular field of view in a more satisfactory manner.

A drive mechanism for driving the movable lens groups that form the variable focal length lens system 11 in the imaging apparatus 200 in the optical axis direction when the lens position setting is changed is the same as the drive mechanism in the lens barrel 100 shown in FIGS. 1 to 3, and the description of the drive mechanism is omitted for convenience.

The variable focal length lens system 11 incorporated in the lens barrel 100 in the imaging apparatus 200 is desirably configured to satisfy the following conditional equation (1):

$$0.7 < TLw/TLt < 0.85 \tag{1}$$

where TLw represents the overall length of the lens system in the wide angle end state, and TLt represents the overall length of the lens system in the telescopic end state.

The conditional equation (1) defines the change in the overall length of the lens system that occurs when the lens position setting is changed, that is, the conditional equation (1) determines how much the first lens group holding member 103 can be extended.

When TLw/TLt is greater than the upper limit of the conditional equation (1), the first lens group holding member 103 becomes thicker in the optical axis direction, resulting in an increased barrel thickness at the time when the lens system retracts.

As a result, in the lens barrel 100 in the imaging apparatus 200, the barrel thickness at the time when the lens system retracts is not thin enough, and sufficient size reduction will not be achieved.

When TLw/TLt is smaller than the lower limit of the conditional equation (1), the cam tube 106 and the fixed tube 108 become thicker in the optical axis direction by the amount corresponding to the decrease in thickness of the first lens group holding member 103 in the optical axis direction.

As a result, in the lens barrel 100 in the imaging apparatus 200, when TLw/TLt is smaller than the lower limit of the conditional equation (1), the barrel thickness at the time when the lens system retracts is not thin enough, and sufficient size reduction will not be achieved.

Further, in the lens barrel 100 in the imaging apparatus 200, the variable focal length lens system 11 is desirably configured to satisfy the following conditional equations (2) and (3):

$$0.2 < \Delta 3/TLt < 0.4 \tag{2}$$

$$0.05 < \Delta 4/TLt < 0.2 \tag{3}$$

where $\Delta 3$ represents how much the third lens group travels when the lens position setting is changed from the wide angle end state to the telescopic end state, and $\Delta 4$ represents how much the fourth lens group travels when the lens position setting is changed from the wide angle end state to the telescopic end state.

The conditional equations (2) and (3) respectively define how much the third lens group G3 and the fourth lens group G4 travel when the lens position setting is changed. When $\Delta 3/TLt$ is smaller than the lower limit of the conditional equation (2), the effect of the third lens group G3 of changing the magnification of the lens system is insufficient.

As a result, in the lens barrel 100 in the imaging apparatus 200, the effect of the second lens group G2 in the variable focal length lens system 11 on changing the magnification of the lens system is instead increased to provide a predetermined variable power ratio. In this case, it is difficult to correct the change in axial aberrations in a satisfactory manner induced in the second lens group G2 when the lens position setting is changed.

Conversely, when $\Delta 3/TLt$ is greater than the upper limit of the conditional equation (2), the travel of the third lens holding member 110 increases. As a result, in the lens barrel 100 in the imaging apparatus 200, the cam 106D in the cam tube 106 needs to extend in the optical axis direction, which causes the cam 106D to mechanically interfere with the other cams 106C and 106E. To prevent the interference, the cam tube 106 inevitably needs to be thicker in the optical axis direction, resulting in an increased thickness of the lens barrel 100 in the collapsed state in which the lens system retracts.

When $\Delta 4/TLt$ is smaller than the lower limit of the conditional equation (3), off-axis light fluxes having passed through the fourth lens group G4 greatly shift away from the optical axis in the telescopic end state because the fourth lens group G4 moves only slightly.

As a result, in the lens barrel 100 in the imaging apparatus 200, change in off-axis aberrations induced in the fourth lens group G4 due to the change in angular field of view may not be corrected in a satisfactory manner, resulting in no further improvement in the optical performance.

Conversely, when Δ4/TLt is greater than the upper limit of the conditional equation (3), the lateral magnification of the fourth lens group G4 in the telescopic end state increases in the positive direction. As a result, an image formed by the first lens group G1 to the third lens group G3 is greatly magnified. In this case, the optical performance may significantly decrease even when any of the first lens group G1 to the third lens group G3 is slightly decentered in a manufacturing process.

In the lens barrel 100 in the imaging apparatus 200, it is more preferable that the following conditional equation (4) as well as the conditional equations (2) and (3) are satisfied.

$$\Delta 4/\Delta 3 < 0.9 \quad (4)$$

When Δ4/Δ3 is greater than the upper limit of the conditional equation (4), the cam follower 110A on the third lens holding member 110 and the cam follower 117A on the fourth lens holding member 117 interfere with each other in the telescopic end state. As a result, the cam tube 106 inevitably needs to be thicker in the optical axis direction, resulting in an increased barrel thickness.

Further, in the variable focal length lens system 11 in the lens barrel 100 in the imaging apparatus 200, an aperture diaphragm is desirably disposed in the vicinity of the third lens group G3 in order to reduce the effective lens diameter in each of the lens groups so that change in off-axis aberrations that occurs when the lens position setting is changed is corrected in a satisfactory manner.

In general, when the lens position setting is changed, the height of off-axis light fluxes passing through each of the lens groups tends to change as the number of lens groups the distance from which to the aperture diaphragm changes increases. The change in the height is used to correct the change in off-axis aberrations that occurs when the lens position setting is changed, and the correction can be made in a more satisfactory manner by intentionally changing the height of off-axis light fluxes.

In particular, in the variable focal length lens system 11 in the lens barrel 100 in the imaging apparatus 200, when an aperture diaphragm is disposed in the vicinity of the third lens group G3, a plurality of movable lens groups can be disposed upstream and downstream of the aperture diaphragm in a well balanced manner, whereby comma aberration can be corrected in a more satisfactory manner and the performance of the lens system is enhanced accordingly.

Further, in the variable focal length lens system 11 in the lens barrel 100 in the imaging apparatus 200, since the third lens group G3 is positioned in the vicinity of the center of the overall lens system, the aperture diaphragm is also positioned in the vicinity of the center of the overall lens system, whereby the height of off-axis light fluxes passing through each of the lens groups will not greatly shift away from the optical axis. As a result, the lens diameter can be reduced.

In the variable focal length lens system 11 in the lens barrel 100 in the imaging apparatus 200, the lens diameter can be further reduced and the barrel structure can be simplified by disposing the aperture diaphragm on the object side of the third lens group G3 and integrally moving the aperture diaphragm and the third lens group G3 when the lens position setting is changed.

In the variable focal length lens system 11 in the lens barrel 100 in the imaging apparatus 200, disposing the aperture diaphragm on the object side of the third lens group G3 allows the height of the off-axis light fluxes having passed through the first lens group G1 from the optical axis to be reduced particularly in the wide angle end state, whereby the size of the lens system can be reduced.

At the same time, in the variable focal length lens system 11 in the lens barrel 100 in the imaging apparatus 200, since the off-axis light fluxes having passed through the first lens group G1 shift toward the optical axis in the wide angle end state, comma aberration that appears the periphery of the screen can be suppressed and the performance of the lens system can be enhanced accordingly.

In the proximity focusing, in which a state in which a subject located at an infinite distance is brought into focus is changed to a state in which a subject located at a near distance is brought into focus, it is desirable in the variable focal length lens system 11 in the lens barrel 100 in the imaging apparatus 200 that the fifth lens group G5 is moved in the optical axis direction.

The reason for this is that the fifth lens group G5 is disposed in a position close to the image plane position and axial light fluxes and off-axis light fluxes passing through the fifth lens group G5 are spaced apart from each other, whereby the axial light fluxes and the off-axis light fluxes can be corrected independently. The fifth lens group G5 is thus suitably used to correct change in off-axis aberrations that occurs when the subject position changes.

Further, in the variable focal length lens system 11 in the lens barrel 100 in the imaging apparatus 200, the following conditional equation (5) is desirably satisfied to reduce the lens diameter and shorten the overall length of the lens system in a well balanced manner:

$$1.8 < fl/(fw \times ft)^{1/2} < 2.7 \quad (5)$$

where fl represents the focal length of the first lens group, fw represents the focal length of the overall lens system in the wide angle end state, and ft represents the focal length of the overall lens system in the telescopic end state.

The conditional equation (5) defines the focal length fl of the first lens group G1. When $fl/(fw \times ft)^{1/2}$ is greater than the upper limit of the conditional equation (5), light fluxes passing through the first lens group G1 less converges in the variable focal length lens system 11 in the lens barrel 100 in the imaging apparatus 200, resulting in an increased overall length of the lens system in the telescopic end state.

Conversely, when $fl/(fw \times ft)^{1/2}$ is smaller than the lower limit of the conditional equation (5), light fluxes passing through the first lens group G1 more converges in the variable focal length lens system 11 in the lens barrel 100 in the imaging apparatus 200, resulting in an increased lens diameter because off-axis light fluxes in the wide angle end state shift away from the optical axis.

On the other hand, when the refracting power of the first lens group G1 increases, higher-order spherical aberrations induced in the first lens group alone in the telescopic end state may not be corrected in a satisfactory manner. In this case, it is conceivable that a variable aperture diaphragm is used and the size of the full aperture is changed when the lens position setting is changed, which however, for example, increases noise when a low-illuminance subject is imaged.

In consideration of this fact, it is desirable in the variable focal length lens system 11 in the lens barrel 100 in the imaging apparatus 200 that the lower limit of the conditional equation (5) is set to "2.0" to correct the higher-order spherical aberrations induced in the first lens group alone in a more satisfactory manner so that the full-aperture f-number decreases in the telescopic end state.

In the variable focal length lens system 11 in the lens barrel 100 in the imaging apparatus 200, using an aspheric lens allows much higher optical performance to be achieved. In particular, in the variable focal length lens system 11 in the lens barrel 100 in the imaging apparatus 200, using an aspheric lens in the second lens group G2 allows change in comma aberration induced when the angular field of view is changed in the wide angle end state to be corrected in a satisfactory manner.

Further, in the variable focal length lens system 11 in the lens barrel 100 in the imaging apparatus 200, introducing an aspheric lens in any of the third lens group G3 to the fifth lens group G5 allows the performance at the center of the lens system to be further enhanced. Moreover, in the variable focal length lens system 11 in the lens barrel 100 in the imaging apparatus 200, using a plurality of aspheric surfaces in any of the lens groups, of course, allows the optical performance of the lens system to be further enhanced.

Further, in the variable focal length lens system 11 in the lens barrel 100 in the imaging apparatus 200, to correct spherical aberration induced in the first lens group alone so that excellent optical performance is achieved particularly in the telescopic end state, the first lens group G1 is desirably a doublet formed of a negative lens having a concave surface facing the image side and a positive lens having a convex surface facing the object side.

The doublet can be replaced with separate negative and positive lenses, whereby color aberration and spherical aberration induced in the first lens group G1 can be corrected in a satisfactory manner in the variable focal length lens system 11 in the lens barrel 100 in the imaging apparatus 200.

When separate negative and positive lenses are used in the variable focal length lens system 11 in the lens barrel 100 in the imaging apparatus 200, however, even a slight amount of decentering of any of the negative and positive lenses in a manufacturing process significantly degrades the optical performance. A doublet is therefore desirable.

In addition, in the variable focal length lens system 11 in the lens barrel 100 in the imaging apparatus 200, an image can be shifted by shifting one of the lens groups that form the lens system or part of the lenses that form any of the lens groups in a direction substantially perpendicular to the optical axis.

In the variable focal length lens system 11 in the lens barrel 100 in the imaging apparatus 200, a detection system for detecting inclination of the camera, an computation system for computing the amount of inclination based on image shift information from the detection system, a drive system for shifting a predetermined lens in accordance with the information on the amount of inclination from the computation system are combined with the predetermined lens.

In the thus configured variable focal length lens system 11 in the lens barrel 100 in the imaging apparatus 200, image shift due to camera shaking that may occur when a shutter release button is pressed can be canceled or reduced by shifting the predetermined lens.

In particular, in the variable focal length lens system 11 in the lens barrel 100 in the imaging apparatus 200, degradation in performance that occurs when the third lens group G3 is shifted in a direction substantially perpendicular to the optical axis can be reduced.

Further, in the variable focal length lens system 11 in the lens barrel 100 in the imaging apparatus 200, when an aperture diaphragm is disposed in the vicinity of the third lens group G3, off-axis light fluxes pass through a paraxial region. It is therefore possible to suppress change in off-axis aberrations that occurs when the third lens group G3 is shifted in a direction substantially perpendicular to the optical axis.

In the variable focal length lens system 11 in the lens barrel 100 in the imaging apparatus 200, it is, of course, possible to dispose a low-pass filter for preventing what is called moire fringes from being produced on the image side of the lens system and an infrared blocking filter in accordance with the spectral sensitivity characteristic of the light receiving device in the imaging device unit IMG.

[5-2. Configuration of Digital Still Camera]

As shown in FIG. 13, a digital still camera 300 in which the imaging apparatus 200 described above is incorporated includes the imaging apparatus 200 responsible for imaging and a camera single processor 20 that performs analog-digital conversion and other single processing on an image signal captured by the imaging apparatus 200.

The digital still camera 300 further includes an image processor 30 that records, reproduces, and otherwise processes the image signal, an LCD (Liquid Crystal Display) 40 that displays a captured or otherwise processed image, and a reader/writer 50 that reads/writes information from and to a memory card 51.

The digital still camera 300 further includes a CPU (Central Processing Unit) 60 that controls the entire camera, an input section 70 through which a user inputs instruction, and a lens drive controller 80 that drives lenses in the imaging apparatus 200.

The imaging apparatus 200 is a combination of the variable focal length lens system 11 (or 12, 13) and the imaging device unit IMG formed, for example, of a CCD (Charge Coupled Device) sensor or a CMOS (Complementary Metal Oxide Semiconductor) sensor.

The camera single processor 20 converts an output signal from the imaging device unit IMG into a digital signal, performs noise removal and image quality correction, converts the digital signal into brightness/color difference signals, and performs other signal processing.

The image processor 30 performs compression coding and decompression decoding on an image signal based on a predetermined image data format, performs data format conversion, such as resolution conversion, and performs other image processing.

The memory card 51 is formed of a removable semiconductor memory. The reader/writer 50 writes image data encoded by the image processor 30 on the memory card 51 and reads image data recorded on the memory card 51.

The CPU 60 oversees circuit blocks in the digital still camera 300 and controls each of the circuit blocks based, for example, on an instruction input signal from the input section 70.

The input section 70 is formed, for example, of a shutter release button for shutter operation and a selection switch for selecting an action mode and outputs an instruction input signal according to user's operation to the CPU 60.

The lens drive controller 80 controls a motor or any other actuator (not shown) that drives lenses in the variable focal length lens system 11 (or 12, 13) based on a control signal from the CPU 60.

The action of the digital still camera 300 will next be briefly described. The digital still camera 300 in an imaging standby state outputs an image signal captured by the imaging apparatus 200 to the LCD 40 through the camera single processor 20 and displays camera-through images on the LCD 40 under the control of the CPU 60.

When the digital still camera 300 receives a zooming instruction input signal from the input section 70, the CPU 60 outputs a control signal to the lens drive controller 80, which then moves a predetermined lens in the variable focal length lens system 11 (or 12, 13) under the control of the lens drive controller 80.

When a shutter (not shown) in the imaging apparatus 200 is operated in response to the instruction input signal from the input section 70, the digital still camera 300 outputs a captured image signal through the camera single processor 20 to the image processor 30.

The image processor 30 performs predetermined compression coding on the image signal supplied from the camera single processor 20, converts the encoded image signal into digital data expressed in a predetermined data format, and writes the digital data onto the memory card 51 through the reader/writer 50.

Focusing is carried out, for example, as follows: When the shutter release button is pressed halfway or fully pressed for recording, the lens drive controller 80 drives and controls the variable focal length lens system 11 (or 12, 13) based on a control signal from the CPU 60.

To reproduce image data recorded on the memory card 51, the CPU 60 reads the image data from the memory card 51 through the reader/writer 50 in response to user's operation performed through the input section 70, and the image processor 30 performs decompression decoding on the read image data, which is then outputted to the LCD 40.

The LCD 40 displays reproduced images based on the image data having undergone the decompression decoding in the image processor 30.

The present embodiment has been described with reference to a case where the imaging apparatus according to any of the embodiments of the invention is incorporated in a digital still camera. The imaging apparatus according to any of the embodiments of the invention can alternatively be incorporated in a digital video camcorder or any other electronic apparatus.

6. Other Embodiments

The specific shapes, structures, and values of the components shown in the first and second numerical examples corresponding to the first embodiment described above and the third numerical example corresponding to the second embodiment described above are presented only by way of example for implementing the invention and should not be used to construe the technical extent of the invention in a limited sense.

Further, the above embodiments have been described with reference to the case where the aperture diaphragm S is disposed in the vicinity of the third lens group G3 and on the object side thereof in order to reduce the effective lens diameter in each of the lens groups so that change in off-axis aberrations that occurs when the lens position setting is changed is corrected in a satisfactory manner.

The invention is not limited to the case described above, and the aperture diaphragm S may be disposed in the vicinity of the third lens group G3 but on the image side thereof.

Further, the above embodiments have been described with reference to the case where the imaging apparatus 200 is incorporated, for example, in the digital still camera 300, but an apparatus in which the imaging apparatus 200 is incorporated is not limited to a digital still camera. The imaging apparatus 200 can alternatively be widely incorporated in a variety of other electronic apparatus, such as a digital video camcorder, a mobile phone, a personal computer equipped with a camera, and a PDA equipped with a camera.

The present application contains subject matter related to that disclosed in Japanese Priority Patent Application JP 2009-295379 filed in the Japan Patent Office on Dec. 25, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A lens barrel comprising:
    a variable focal length lens system including at least three movable lens groups; and
    guiding means for moving the variable focal length lens system forward and backward in an optical axis direction,
    wherein the variable focal length lens system includes at least a first lens group having positive refracting power, a second lens group having negative refracting power, and a third lens group having positive refracting power, arranged in this order from an object side,
    when a lens position setting is changed from a wide angle end state to a telescopic end state, at least the first and third lens groups are moved toward the object side in such a way that air separation between the first lens group and the second lens group monotonically increases and air separation between the second lens group and the third lens group monotonically decreases,
    the guiding means includes
    a fixed frame,
    a rotating frame to move forward and backward in the optical axis direction relative to the fixed frame while rotating around an optical axis relative to the fixed frame,
    a rectilinear guiding frame that is disposed in the rotating frame and does not rotate when the rotating frame rotates but moves integrally with the rotating frame in the optical axis direction,
    a first guide frame to move the first lens group forward and backward in the optical axis direction relative to the rectilinear guiding frame, and
    a second guide frame to move the third lens group forward and backward in the optical axis direction relative to the rectilinear guiding frame, the second lens group is integrated with the rectilinear guiding frame, and the rectilinear guiding frame is fixed in the optical axis direction when the lens position setting is changed from the wide angle end state to the telescopic end state.

2. The lens barrel according to claim 1, wherein the following conditional equation (1) is satisfied in the lens barrel $$0.7 < TLw/TLt < 0.85 \tag{1}$$

where TLw represents a first overall length of the lens system in the wide angle end state, and TLt represents a second overall length of the lens system in the telescopic end state.

3. The lens barrel according to claim 2,
    wherein the following conditional equations (2) and (3) are satisfied in the lens barrel $$0.2 < \Delta 3/TLt < 0.4 \tag{2}$$

$$0.05 < \Delta 4/TLt < 0.2 \tag{3}$$

where $\Delta 3$ represents how much the third lens group travels when the lens position setting is changed from the wide angle end state to the telescopic end state, and $\Delta 4$ represents how much a fourth lens group travels when the lens position setting is changed from the wide angle end state to the telescopic end state.

4. The lens barrel according to claim 3,
wherein the following conditional equation (4) is satisfied in the lens barrel $$\Delta 4/\Delta 3 < 0.9 \qquad (4).$$

5. The lens barrel according to claim 4,
further comprising an aperture diaphragm disposed on the object side of the third lens group,
wherein the aperture diaphragm moves integrally with the third lens group when the lens position setting is changed.

6. The lens barrel according to claim 5,
wherein the following conditional equation (5) is satisfied in the lens barrel $$1.8 < fl/(fw \times ft)^{1/2} < 2.7 \qquad (5)$$

where fl represents a first focal length of the first lens group, fw represents a second focal length of the overall lens system in the wide angle end state, and ft represents a third focal length of the overall lens system in the telescopic end state.

7. An imaging apparatus comprising:
a lens barrel including a variable focal length lens system including at least three movable lens groups and guiding means for moving the variable focal length lens system forward and backward in an optical axis direction; and
an imaging device to convert an optical image formed by the variable focal length lens system into an electric signal,
wherein the variable focal length lens system includes at least a first lens group having positive refracting power, a second lens group having negative refracting power, and a third lens group having positive refracting power, arranged in this order from an object side,
when a lens position setting is changed from a wide angle end state to a telescopic end state, at least the first and third lens groups are moved toward the object side in such a way that air separation between the first lens group and the second lens group monotonically increases and air separation between the second lens group and the third lens group monotonically decreases,
the guiding means includes
a fixed frame,
a rotating frame to move forward and backward in the optical axis direction relative to the fixed frame while rotating around an optical axis relative to the fixed frame,
a rectilinear guiding frame that is disposed in the rotating frame and does not rotate when the rotating frame rotates but moves integrally with the rotating frame in the optical axis direction,
a first guide frame to move the first lens group forward and backward in the optical axis direction relative to the rectilinear guiding frame, and
a second guide frame to move the third lens group forward and backward in the optical axis direction relative to the rectilinear guiding frame, the second lens group is integrated with the rectilinear guiding frame, and the rectilinear guiding frame is fixed in the optical axis direction when the lens position setting is changed from the wide angle end state to the telescopic end state.

8. A lens barrel comprising:
a variable focal length lens system including at least three movable lens groups; and
a guiding unit configured to move the variable focal length lens system forward and backward in an optical axis direction,
wherein the variable focal length lens system includes at least a first lens group having positive refracting power, a second lens group having negative refracting power, and a third lens group having positive refracting power, arranged in this order from an object side,
when a lens position setting is changed from a wide angle end state to a telescopic end state, at least the first and third lens groups are moved toward the object side in such a way that air separation between the first lens group and the second lens group monotonically increases and air separation between the second lens group and the third lens group monotonically decreases,
the guiding unit includes
a fixed frame,
a rotating frame to move forward and backward in the optical axis direction relative to the fixed frame while rotating around an optical axis relative to the fixed frame,
a rectilinear guiding frame that is disposed in the rotating frame and does not rotate when the rotating frame rotates but moves integrally with the rotating frame in the optical axis direction,
a first guide frame to move the first lens group forward and backward in the optical axis direction relative to the rectilinear guiding frame, and
a second guide frame to move the third lens group forward and backward in the optical axis direction relative to the rectilinear guiding frame, the second lens group is integrated with the rectilinear guiding frame, and the rectilinear guiding frame is fixed in the optical axis direction when the lens position setting is changed from the wide angle end state to the telescopic end state.

9. An imaging apparatus comprising:
a lens barrel including a variable focal length lens system including at least three movable lens groups and a guiding unit configured to move the variable focal length lens system forward and backward in an optical axis direction; and
an imaging device to convert an optical image formed by the variable focal length lens system into an electric signal,
wherein the variable focal length lens system includes at least a first lens group having positive refracting power, a second lens group having negative refracting power, and a third lens group having positive refracting power, arranged in this order from an object side,
when a lens position setting is changed from a wide angle end state to a telescopic end state, at least the first and third lens groups are moved toward the object side in such a way that air separation between the first lens group and the second lens group monotonically increases and air separation between the second lens group and the third lens group monotonically decreases, the guiding unit includes a fixed frame, a rotating frame to move forward and backward in the optical axis direction relative to the fixed frame while rotating around an optical axis relative to the fixed frame, a rectilinear guiding frame that is disposed in the rotating frame and does not rotate when the rotating frame rotates but moves integrally with the rotating frame in the optical axis direction, a first guide frame to move the first lens group forward and backward in the optical axis direction relative to the rectilinear guiding frame, and a second guide frame to move the third lens group forward and backward in the optical axis direction relative to the rectilinear guiding frame, the second lens group is integrated with the rectilinear guiding frame, and the rectilinear guiding frame is fixed in the optical axis direction when the lens position setting is changed from the wide angle end state to the telescopic end state.

* * * * *